(12) United States Patent
Oe

(10) Patent No.: US 9,430,804 B2
(45) Date of Patent: *Aug. 30, 2016

(54) POWER DEMAND PLAN ADJUSTING DEVICE, POWER DEMAND PLAN ADJUSTING METHOD AND PROGRAM

(75) Inventor: Ryuji Oe, Hiroshima (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 513 days.

This patent is subject to a terminal disclaimer.

(21) Appl. No.: 14/006,597

(22) PCT Filed: Mar. 28, 2011

(86) PCT No.: PCT/JP2011/057594
§ 371 (c)(1),
(2), (4) Date: Oct. 21, 2013

(87) PCT Pub. No.: WO2012/131869
PCT Pub. Date: Oct. 4, 2012

(65) Prior Publication Data
US 2014/0031999 A1    Jan. 30, 2014

(51) Int. Cl.
*G06Q 50/06* (2012.01)
*G06Q 10/06* (2012.01)
(Continued)

(52) U.S. Cl.
CPC .......... *G06Q 50/06* (2013.01); *G06Q 10/0631* (2013.01); *H02J 3/00* (2013.01);
(Continued)

(58) Field of Classification Search
CPC .............. G06Q 50/06; G06Q 10/0631; H02J 2003/003; H02J 3/382; Y04S 10/545; Y04S 10/54; Y02E 40/76; Y02E 70/30

USPC .......................................................... 700/291
See application file for complete search history.

(56) References Cited

U.S. PATENT DOCUMENTS 8,350,521 B2 *    1/2013   Reineccius ........... H01M 10/44
                                                  320/101
2010/0076825 A1 *  3/2010   Sato .......................... B60L 3/12
                                                  705/14.1
(Continued)

FOREIGN PATENT DOCUMENTS

JP    2004040956 A    2/2004
JP    2005102364 A    4/2005
(Continued)

OTHER PUBLICATIONS

Watanabe et.al., "Simulation of Electricity Market -Development of Basic Market Model with Unit Commitment-", [online], Mar. 2004, Central Research Institute of Electric Power Industry, [Searched Apr. 23, 2010], Web site (URL), <http://criepi.denken.or.jp/jp/kenkikaku/report/detail/R03016.html>.
(Continued)

*Primary Examiner* — Robert Fennema
*Assistant Examiner* — Sivalingam Sivanesan
(74) *Attorney, Agent, or Firm* — Harness, Dickey & Pierce, P.L.C.

(57) ABSTRACT

The economical load distribution adjusting device 10 acquires an optimal hydroelectric output, optimal demand, and optimal power price from the supply-demand planning device 23, acquires the planned hydroelectric output planned by the water level planning devices 21, and acquires a planned demand planned by the charge control devices 22. The economical load distribution adjusting device 10 reduces the power price of the time at which the planned hydroelectric output exceeds the optimal output and makes the water level planning devices 21 replan the hydroelectric output, and raises the power price of the time at which the planned demand exceeds the optimal demand and makes the charge control devices 22 replan the amount of demand.

12 Claims, 29 Drawing Sheets

(51) Int. Cl.
*H02J 3/00* (2006.01)
*H02J 3/32* (2006.01)
*H02J 3/38* (2006.01)

(52) U.S. Cl.
CPC ............... *H02J 3/32* (2013.01); *H02J 3/382* (2013.01); *H02J 2003/003* (2013.01); *Y02E 40/76* (2013.01); *Y02E 70/30* (2013.01); *Y04S 10/54* (2013.01); *Y04S 10/545* (2013.01)

(56) References Cited

U.S. PATENT DOCUMENTS

| | | | | |
|---|---|---|---|---|
| 2011/0313603 | A1* | 12/2011 | Laberteaux | B60L 11/184 701/22 |
| 2012/0005126 | A1* | 1/2012 | Oh | G06Q 50/06 705/412 |
| 2013/0015713 | A1* | 1/2013 | Hagihara | H02J 3/32 307/72 |

FOREIGN PATENT DOCUMENTS

| | | |
|---|---|---|
| JP | 2008067418 A | 3/2008 |
| JP | 2009223692 A | 10/2009 |
| JP | 2009257703 A | 11/2009 |
| JP | 2010081722 A | 4/2010 |

OTHER PUBLICATIONS

Watanabe, et al., "Agent-based Simulation Model of Electricity Market with Stochastic Unit Commitment", 8$^{th}$ International Conference of Probabilistic Methods Applied to Power Systems, Iowa State University, Ames, Iowa, Sep. 12-16, 2004.

International Search Report (in English and Japanese) and Written Opinion (in Japanese) for PCT/JP2011/057594, mailed Apr. 19, 2011; ISA/JP.

Japanese Office Action for Application No. JP-2011-539580, mailed Oct. 25, 2011 (with English translation).

Search Report, European Patent Application No. 11862676.1, Aug. 11, 2014.

* cited by examiner

| TIME (O'CLOCK) | MINIMUM CAPACITY Cmin [kWh] | MAXIMUM CAPACITY Cmax [kWh] | CHARGE AMOUNT C [kWh] | USAGE AMOUNT [kWh] | MINIMUM CARRIED CURRENT PINmin [kW] | MAXIMUM CARRIED CURRENT PINmax [kW] | CARRIED CURRENT PIN [kW] | POWER PRICE [¥/kWh] | ELECTRIC POWER EXPENSE [¥] |
|---|---|---|---|---|---|---|---|---|---|
| 8 | 30.0 | 190.0 | 190.0 | 0.0 | 0.0 | 30.0 | 0.0 | 6.34 | 0.0 |
| 9 | 30.0 | 200.0 | 190.0 | 0.0 | 0.0 | 30.0 | 0.0 | 8.10 | 0.0 |
| 10 | 30.0 | 200.0 | 190.0 | 0.0 | 0.0 | 30.0 | 0.0 | 8.25 | 0.0 |
| 11 | 30.0 | 200.0 | 190.0 | 0.0 | 0.0 | 30.0 | 0.0 | 8.46 | 0.0 |
| 12 | 30.0 | 200.0 | 190.0 | 0.0 | 0.0 | 30.0 | 0.0 | 8.25 | 0.0 |
| 13 | 30.0 | 200.0 | 190.0 | 0.0 | 0.0 | 30.0 | 0.0 | 8.67 | 0.0 |
| 14 | 30.0 | 200.0 | 190.0 | 40.0 | 0.0 | 30.0 | 0.0 | 8.77 | 0.0 |
| 15 | 30.0 | 200.0 | 150.0 | 40.0 | 0.0 | 30.0 | 0.0 | 8.57 | 0.0 |
| 16 | 30.0 | 200.0 | 110.0 | 40.0 | 0.0 | 30.0 | 0.0 | 8.51 | 0.0 |
| 17 | 30.0 | 200.0 | 70.0 | 0.0 | 0.0 | 30.0 | 0.0 | 7.99 | 0.0 |
| 18 | 30.0 | 200.0 | 70.0 | 0.0 | 0.0 | 30.0 | 0.0 | 6.80 | 0.0 |
| 19 | 30.0 | 200.0 | 70.0 | 0.0 | 0.0 | 30.0 | 0.0 | 6.62 | 0.0 |
| 20 | 30.0 | 200.0 | 70.0 | 40.0 | 0.0 | 30.0 | 0.0 | 6.27 | 0.0 |
| 21 | 30.0 | 200.0 | 30.0 | 0.0 | 0.0 | 30.0 | 30.0 | 5.98 | 179.4 |
| 22 | 30.0 | 200.0 | 60.0 | 0.0 | 0.0 | 30.0 | 0.0 | 6.66 | 0.0 |
| 23 | 30.0 | 200.0 | 60.0 | 0.0 | 0.0 | 30.0 | 0.0 | 6.41 | 0.0 |
| 0 | 30.0 | 200.0 | 60.0 | 0.0 | 0.0 | 30.0 | 0.0 | 6.05 | 0.0 |
| 1 | 30.0 | 200.0 | 60.0 | 0.0 | 0.0 | 30.0 | 30.0 | 5.94 | 178.2 |
| 2 | 30.0 | 200.0 | 90.0 | 0.0 | 0.0 | 30.0 | 30.0 | 5.92 | 177.6 |
| 3 | 30.0 | 200.0 | 120.0 | 0.0 | 0.0 | 30.0 | 30.0 | 5.92 | 177.6 |
| 4 | 30.0 | 200.0 | 150.0 | 0.0 | 0.0 | 30.0 | 30.0 | 5.91 | 177.3 |
| 5 | 30.0 | 200.0 | 180.0 | 0.0 | 0.0 | 30.0 | 10.0 | 6.00 | 60.0 |
| 6 | 30.0 | 200.0 | 190.0 | 0.0 | 0.0 | 30.0 | 0.0 | 6.17 | 0.0 |
| 7 | 30.0 | 200.0 | 190.0 | 0.0 | 0.0 | 30.0 | 0.0 | 6.32 | 0.0 |
| 8 | 190.0 | 190.0 | 190.0 | 0.0 | 0.0 | 30.0 | 0.0 | | |
| | | | | | | | | | 950.1 |

FIG. 4

PRICE LIST 61

| TIME | POWER PLANT 1 | POWER PLANT 2 | POWER PLANT 3 | POWER PLANT 4 | POWER PLANT 5 |
|---|---|---|---|---|---|
| 1 | 4.62 | 4.62 | 4.62 | 4.62 | 4.62 |
| 2 | 4.46 | 4.46 | 4.46 | 4.46 | 4.46 |
| ... | ... | ... | ... | ... | ... |
| 13 | 10.00 | 10.00 | 10.00 | 10.00 | 10.00 |
| 14 | 9.62 | 9.62 | 9.62 | 9.62 | 9.62 |
| ... | ... | ... | ... | ... | ... |
| 24 | 4.62 | 4.62 | 4.62 | 4.62 | 4.62 |

FIG. 11

OUTPUT LIST 62

| TIME | POWER PLANT 1 | POWER PLANT 2 | POWER PLANT 3 | POWER PLANT 4 | POWER PLANT 5 | HOURLY TOTAL |
|---|---|---|---|---|---|---|
| 1 | 0 | 0 | 0 | 0 | 0 | 0 |
| 2 | 0 | 0 | 0 | 0 | 0 | 0 |
| ... | ... | ... | ... | ... | ... | ... |
| 13 | 50 | 100 | 150 | 200 | 250 | 750 |
| 14 | 50 | 100 | 150 | 200 | 250 | 750 |
| ... | ... | ... | ... | ... | ... | ... |
| 24 | 0 | 0 | 0 | 0 | 0 | 0 |
| DAILY TOTAL | 200 | 400 | 600 | 800 | 1000 | 3000 |

621 → HOURLY TOTAL

FIG. 12

LIMITING CONDITIONS 63

| TIME | POWER PLANT 1 | | POWER PLANT 2 | | POWER PLANT 3 | | POWER PLANT 4 | | POWER PLANT 5 | |
|---|---|---|---|---|---|---|---|---|---|---|
| | Qmin | Qmax | Qmin | Qmax | Qmin | Qmax | Qmin | Qmax | Qmin | Qmax |
| 1 | 0 | 8.0 | 0 | 8.0 | 0 | 8.0 | 0 | 8.0 | 0 | 8.0 |
| 2 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 13 | 0 | 8.0 | 0 | 8.0 | 0 | 8.0 | 0 | 8.0 | 0 | 8.0 |
| 14 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 24 | 0 | 8.0 | 0 | 8.0 | 0 | 8.0 | 0 | 8.0 | 0 | 8.0 |

FIG. 13

PRICE LIST (AFTER SORTING) 61

| TIME | POWER PLANT 5 | POWER PLANT 4 | POWER PLANT 3 | POWER PLANT 2 | POWER PLANT 1 |
|---|---|---|---|---|---|
| 1 | 4.62 | 4.62 | 4.62 | 4.62 | 4.62 |
| 2 | 4.46 | 4.46 | 4.46 | 4.46 | 4.46 |
| ... | ... | ... | ... | ... | ... |
| 13 | 10.00 | 10.00 | 10.00 | 10.00 | 10.00 |
| 14 | 9.62 | 9.62 | 9.62 | 9.62 | 9.62 |
| ... | ... | ... | ... | ... | ... |
| 24 | 4.62 | 4.62 | 4.62 | 4.62 | 4.62 |

FIG. 14

OUTPUT LIST (AFTER SORTING) 62

| TIME | POWER PLANT 5 | POWER PLANT 4 | POWER PLANT 3 | POWER PLANT 2 | POWER PLANT 1 | HOURLY TOTAL |
|---|---|---|---|---|---|---|
| 1 | 0 | 0 | 0 | 0 | 0 | 0 |
| 2 | 0 | 0 | 0 | 0 | 0 | 0 |
| ... | ... | ... | ... | ... | ... | ... |
| 13 | 250 | 200 | 150 | 100 | 50 | 750 |
| 14 | 250 | 200 | 150 | 100 | 50 | 750 |
| ... | ... | ... | ... | ... | ... | ... |
| 24 | 0 | 0 | 0 | 0 | 0 | 0 |
| DAILY TOTAL | 1000 | 800 | 600 | 400 | 200 | 3000 |

FIG. 15

TIME TABLE IN
ORDER OF OUTPUT 64

| k | t(k) |
|---|------|
| 1 | 13 |
| 2 | 14 |
| ⋮ | ⋮ |
| 24 | 24 |

FIG. 16

PRICE LIST

| TIME | POWER PLANT 5 | POWER PLANT 4 | POWER PLANT 3 | POWER PLANT 2 | POWER PLANT 1 |
|---|---|---|---|---|---|
| 1 | 4.62 | 4.62 | 4.62 | 4.62 | 4.62 |
| 2 | 4.46 | 4.46 | 4.46 | 4.46 | 4.46 |
| ... | ... | ... | ... | ... | ... |
| 13 | 10.00 | 10.00 | 10.00 | 10.00 | 0.01 |
| 14 | 9.62 | 9.62 | 9.62 | 9.62 | 9.62 |
| ... | ... | ... | ... | ... | ... |
| 24 | 4.62 | 4.62 | 4.62 | 4.62 | 4.62 |

FIG. 17

LIMITING CONDITIONS

| TIME | POWER PLANT 1 | | POWER PLANT 2 | | POWER PLANT 3 | | POWER PLANT 4 | | POWER PLANT 5 | |
|---|---|---|---|---|---|---|---|---|---|---|
| | Qmin | Qmax | Qmin | Qmax | Qmin | Qmax | Qmin | Qmax | Qmin | Qmax |
| 1 | 0 | 8.0 | 0 | 8.0 | 0 | 8.0 | 0 | 8.0 | 0 | 8.0 |
| 2 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 13 | 0 | 8.0 | 6.0 | 6.0 | 6.5 | 6.5 | 7.0 | 7.0 | 7.5 | 7.5 |
| 14 | 0 | 8.0 | 0 | 8.0 | 0 | 8.0 | 0 | 8.0 | 0 | 8.0 |
| ... | ... | ... | ... | ... | ... | ... | ... | ... | ... | ... |
| 24 | 0 | 8.0 | 0 | 8.0 | 0 | 8.0 | 0 | 8.0 | 0 | 8.0 |

FIG. 18

LIMITING CONDITIONS 73

| TIME | RECHARGEABLE BATTERY 1 ||||  RECHARGEABLE BATTERY 2 |||| |
|---|---|---|---|---|---|---|---|---|---|
| | MINIMUM CAPACITY | MAXIMUM CAPACITY | MINIMUM CARRIED CURRENT | MAXIMUM CARRIED CURRENT | MINIMUM CAPACITY | MAXIMUM CAPACITY | MINIMUM CARRIED CURRENT | MAXIMUM CARRIED CURRENT | ⋮ |
| 1 | 3.0 | 150 | 0.0 | 150 | 3.0 | 150 | 0.0 | 150 | ⋮ |
| 2 | 3.0 | 150 | 0.0 | 150 | 3.0 | 150 | 0.0 | 150 | ⋮ |
| ⋮ | ⋮ | ⋮ | ⋮ | ⋮ | ⋮ | ⋮ | ⋮ | ⋮ | ⋮ |
| 13 | 3.0 | 150 | 0.0 | 150 | 3.0 | 150 | 0.0 | 150 | ⋮ |
| 14 | 3.0 | 150 | 0.0 | 150 | 3.0 | 150 | 0.0 | 150 | ⋮ |
| ⋮ | ⋮ | ⋮ | ⋮ | ⋮ | ⋮ | ⋮ | ⋮ | ⋮ | ⋮ |
| 24 | 3.0 | 150 | 0 | 150 | 3.0 | 150 | 0 | 150 | ⋮ |

FIG. 21

TIME TABLE IN
ORDER OF DEMAND  74

| k | t(k) |
|---|------|
| 1 | 5 |
| 2 | 6 |
| ⋮ | ⋮ |
| 24 | 24 |

FIG. 22

PRICE LIST (AFTER SORTING)

| TIME | RECHARGEABLE BATTERY 3 | RECHARGEABLE BATTERY 1 | RECHARGEABLE BATTERY 2 |
|---|---|---|---|
| ⋮ | ⋮ | ⋮ | ⋮ |
| 5 | 4.00 | 4.00 | 4.00 |
| 6 | 4.08 | 4.08 | 4.08 |
| 7 | 2.69 | 2.69 | 2.69 |
| 8 | 3.08 | 3.08 | 3.08 |
| ⋮ | ⋮ | ⋮ | ⋮ |
| 24 | 4.62 | 4.62 | 4.62 |

PRICE LIST

| TIME | RECHARGEABLE BATTERY 3 | RECHARGEABLE BATTERY 1 | RECHARGEABLE BATTERY 2 |
|---|---|---|---|
| ⋮ | ⋮ | ⋮ | ⋮ |
| 5 | 4.00 | 99 | 99 |
| 6 | 4.08 | 4.08 | 4.08 |
| 7 | 2.69 | 2.69 | 2.69 |
| 8 | 3.08 | 3.08 | 3.08 |
| ⋮ | ⋮ | ⋮ | ⋮ |
| 24 | 4.62 | 4.62 | 4.62 |

| RECHARGEABLE BATTERY | ADDRESS | AREA NO. | SYSTEM NO. | SERVER NO. |
|---|---|---|---|---|
| 1 | ○○ PREFECTURE xx | A | N01 | S01 |
| 2 | ○○ PREFECTURE xx | A | N02 | S03 |
| 3 | ○○ PREFECTURE xx | B | N03 | S03 |
| ... | ... | ... | ... | ... |

131

POWER DEMAND PLAN ADJUSTING DEVICE, POWER DEMAND PLAN ADJUSTING METHOD AND PROGRAM

TECHNICAL FIELD

The present invention relates to a power demand plan adjusting device, a power demand plan adjusting method and a program.

BACKGROUND ART

Planning of economical load distribution has been conducted to minimize the total power generation cost including such as fuel and start-up expenses or maximize the selling price of generated power while satisfying the demand for power using various mathematical programming. For example, NPL 1 discloses a technology of planning power demand and power supply so that the 24-hour power generation cost is minimized. And PTL 1 discloses a technology of planning the water level of a reservoir so that the price of generated power is maximized. Further, there is a case where the power price for the next day is presented to a customer for the customer to check and determine the usage amount of power demand to use. For example, PTL 2 discloses a technology of controlling the temperature of hot water in a calorifier type tank so that the electric power expense for heating is minimized. In recent years, experiments are being performed to control the demand with real-time power prices which is called a smart grid.

CITATION LIST

Patent Literature

[PTL 1]
Japanese Patent Application Laid-open Publication No. 2009-223692
[PTL 2]
Japanese Patent Application Laid-open Publication No. 2009-257703

Non Patent Literature

[NPL 1]
Watanabe et. al., Simulation of Electricity Market—Development of Basic Market Model with Unit Commitment—, [online], March 2004, Central Research Institute of Electric Power Industry, [Searched Apr. 23, 2010], Web site (URL), <http://criepi.denken.or.jp/jp/kenkikaku/report/detail/R03016.html>

SUMMARY OF INVENTION

Technical Problem

However, with conventional technology various optimal plans, for example, power generation plans for thermal power generation, power generation plans for hydro power generation, hot water plans for calorifiers and the like have been independently conducted so that there is a possibility that an optimal plan is not necessarily carried out as a whole.

The present invention has been made in view of such foregoing background and an object thereof is to provide a power demand plan adjusting device, a power demand plan adjusting method and a program that can adjust a plurality of plans that have been calculated separately.

Solution to Problem

The main aspect of the present invention for solving the aforementioned problem is a device for adjusting a plan of demand for power to charge rechargeable batteries, communicatively connected to each of a supply-demand planning device and a demand planning device, the supply-demand planning device calculating an optimal value of demand for power per unit time as well as calculating an optimal value of power price per the unit time, and the demand planning device planning demand for power to charge the rechargeable batteries in accordance with the power price, the device including an optimal supply-demand plan acquiring unit configured to acquire from the supply-demand planning device an optimal value of the demand for power and an optimal value of the power price per the unit time, an optimal demand acquiring unit configured to control the demand planning device to plan the amount of demand according to the optimal value of the acquired power price and acquire a planned value of the amount of demand from the demand planning device, a group determining unit configured to divide the rechargeable batteries into a plurality of groups, a demand plan statistical computing unit configured to compute a statistical value, for each of the groups, by statistically computing a plan value of the amount of demand of the rechargeable batteries, and a price adjusting unit configured to raise the power price for the unit time at which the planned value of the amount of demand of the rechargeable batteries belonging to the group exceeds the optimal value of the amount of demand, in descending order of the statistically computed value, and to control the demand planning device to plan the amount of demand according to the raised power price.

According to the demand plan adjusting device of the present invention, the demand planning device can be made to recalculate the amount of demand after raising the power price during a unit period when the planned demand exceeds the optimal demand. It is favorable that the charging of a rechargeable battery holds back the demand for power when the power price is high and shifts its demand for power to a time period when the power price is lower. Therefore it is expected that recalculation is done so that the demand for power is reduced when the power price is raised. In this way, the planned demand can be brought close to the optimal demand. Further, since the demand plan adjusting device of the present invention performs calculation in unit of groups, increase in load on calculation can be restrained even when there is a large amount of rechargeable batteries.

Additionally, the power demand plan adjusting device according to the present invention may have the group determining unit randomly divide the rechargeable batteries into groups.

Further, the power demand plan adjusting device according to the present invention may further include an address storage unit configured to store, for each of the rechargeable batteries, an address where a relevant one of the rechargeable batteries is installed, wherein the group determining unit refers to the address storage unit and divides the rechargeable batteries into groups in a manner such that the addresses are dispersed into the plurality of groups.

Further, the power demand plan adjusting device according to the present invention may further include an area storage unit configured to store, for each of the rechargeable batteries, information that specifies an area where a relevant one of the rechargeable batteries is installed, wherein the group determining unit refers to the group storage unit and divides the rechargeable batteries into groups in a manner such that the areas are dispersed into the plurality of groups.

Similar to the case with regard to the amount of power usage, the charge demand of rechargeable batteries is dependent on the area of demand and is recognized that demand concentrates in particular addresses and areas. Therefore, when charging plans are adjusted for all rechargeable batteries of particular addresses and areas where demand concentrates, the concentrated demand would be shifted to other time periods, whereas random groupings or grouping that prevents imbalance between addresses and areas, allows to further certainly disperse the regional concentration of demand.

Further, the power demand plan adjusting device according to the present invention may further include a system storage unit configured to store, for each of the rechargeable batteries, information that specifies an electric power system used to charge a relevant one of the rechargeable batteries, wherein the group determining unit refers to the system storage unit and divides the rechargeable batteries into groups in a manner such that the electric power systems are dispersed into the plurality of groups.

In this case, load on the distribution lines in addition to demand can also be dispersed.

Further, the power demand plan adjusting device according to the present invention may have the power demand plan adjusting device and the demand planning device connected to a server that relays communication between the power demand plan adjusting device and the demand planning device, each of the rechargeable batteries further include a server storage unit configured to store information that specifies the server connected to the demand planning device that plans the power demand of a relevant one of the rechargeable batteries, and the group determining unit refer to the server storage unit and divides the rechargeable batteries into groups in a manner such that the servers are dispersed into the plurality of groups.

In this case, the traffic between the power demand plan adjusting device and the server can also be dispersed.

And according to another aspect of the present inventions is a method for adjusting a plan of demand for power to charge rechargeable batteries including a computer, communicatively connected to each of a supply-demand planning device and a demand planning device, the supply-demand planning device calculating an optimal value of demand for power per unit time as well as calculating an optimal value of power price per the unit time, and the demand planning device planning demand for power to charge the rechargeable batteries in accordance with the power price, acquiring from the supply-demand planning device an optimal value of the demand for power and an optimal value of the power price per the unit time, controlling the demand planning device to plan the amount of demand according to the optimal value of the acquired power price and acquiring a planned value of the amount of demand from the demand planning device, dividing the rechargeable batteries into a plurality of groups, computing a statistical value, for each of the groups, by statistically computing a plan value of the amount of demand of the rechargeable batteries, and raising the power price for the unit time at which the planned value of the amount of demand of the rechargeable batteries belonging to the group exceeds the optimal value of the amount of demand, in descending order of the statistically computed value, and controlling the demand planning device to plan the amount of demand according to the raised power price.

Further, with the power demand plan adjusting method of the present invention, the computer may further store in a memory information that specifies, for each of the rechargeable batteries, an area where a relevant one of the rechargeable batteries is installed, and the computer may refer to the memory and divide the rechargeable batteries into groups in a manner such that the areas are dispersed into the plurality of groups.

Further, with the power demand plan adjusting method of the present invention, the computer may further store in a memory information that specifies, for each of the rechargeable batteries, an electric power system used to charge a relevant one of the rechargeable batteries, and the computer may refer to the memory and divide the rechargeable batteries into groups in a manner such that the electric power systems are dispersed into the plurality of groups.

And another aspect of the present invention is a program for adjusting a plan of demand for power to charge a rechargeable battery having a computer, communicatively connected to each of a supply-demand planning device and a demand planning device, the supply-demand planning device calculating an optimal value of demand for power per unit time as well as calculating an optimal value of power price per the unit time, and the demand planning device planning demand for power to charge the rechargeable batteries in accordance with the power price, execute the steps of acquiring from the supply-demand planning device an optimal value of the demand for power and an optimal value of the power price per the unit time, controlling the demand planning device to plan the amount of demand according to the optimal value of the acquired power price and acquiring a planned value of the amount of demand from the demand planning device, dividing the rechargeable batteries into a plurality of groups, computing a statistical value, for each of the group, by statistically computing a plan value of the amount of demand of the rechargeable batteries, and raising the power price for the unit time at which the planned value of the amount of demand of the rechargeable batteries belonging to the group exceeds the optimal value of the amount of demand, in descending order of the statistically computed value, and controlling the demand planning device to plan the amount of demand according to the raised power price.

Further, with the program of the present invention the computer may be made to further execute a step of storing in a memory information that specifies, for each of the rechargeable batteries, an area where a relevant one of the rechargeable batteries is installed, and the computer may be made to refer to the memory and divide the rechargeable batteries into groups in a manner such that the areas are dispersed into the plurality of groups.

Further, with the program of the present invention, the computer may be made to further execute a step of storing in a memory information that specifies, for each of the rechargeable batteries, an electric power system used to charge a relevant one of the rechargeable batteries, and the computer may be made to refer to the memory and divide the rechargeable batteries into groups in a manner such that the electric power systems are dispersed into the plurality of groups.

The other problems and the solutions for the same described by this application are exposed by the Description of Embodiments, the description of the figures, and others.

Advantageous Effects of Invention

According to the present invention, a plurality of separately calculated plans can be adjusted.

BRIEF DESCRIPTION OF DRAWINGS

FIG. 4 is a diagram showing the configuration of the charge calculation table 231.

FIG. 11 is a table showing an example of the price list 61.

FIG. 12 is a table showing an example of the output list 62.

FIG. 13 is a table showing an example of the limiting conditions list 63.

FIG. 14 is a table showing an example of the price list 61 after sorting.

FIG. 15 is a table showing an example of the output list 62 after sorting.

FIG. 16 is a table showing an example of the time table in order of output 64.

FIG. 17 is a table showing an example of the price list 61 after adjusting the power price.

FIG. 18 is a table showing an example of the list of limiting conditions 63 after adjusting the power price.

FIG. 21 is a table showing an example of the list of limiting conditions 73.

FIG. 22 is a table showing an example of the time table in order of demand 74.

FIG. 25 is a table showing an example of the price list 71 after power price adjustment.

FIG. 28 is a diagram showing the configuration of the rechargeable battery information storage unit 131.

DESCRIPTION OF EMBODIMENTS

Outline

Figure 1:
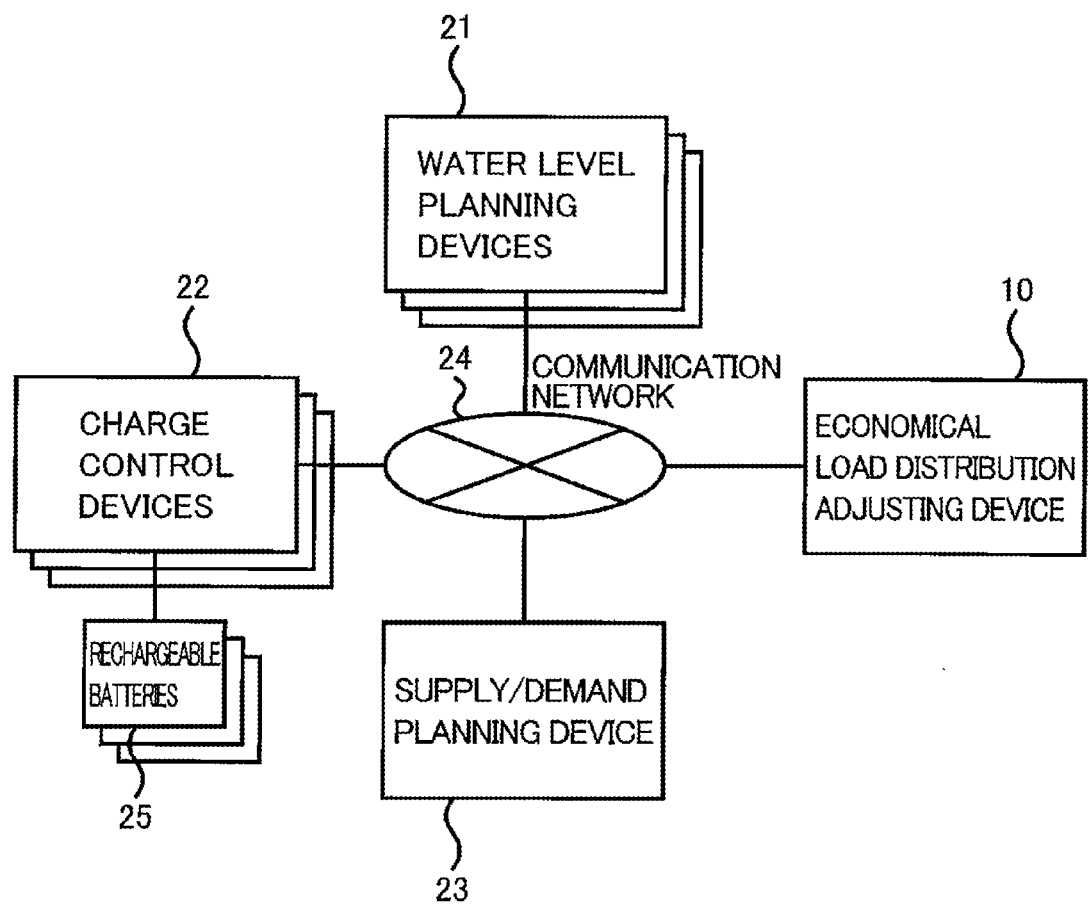
FIG. 1 is a diagram showing the overall configuration of the economical load distributing system according to the present embodiment.

Herein below, description will be given of the economical load distributing system including the economical load distribution adjusting device 10 according to an embodiment of the present invention. As shown in FIG. 1, the economical load distributing system of the present embodiment is configured to include an economical load distribution adjusting device 10, a plurality of water level planning devices 21, a plurality of charge control devices 22, and a supply-demand planning device 23. The economical load distribution adjusting device 10 is connected to the water level planning devices 21, the charge control devices 22 and the supply-demand planning device 23 via the communication network 24. The communication network 24 is, for example, the Internet or a LAN (Local Area Network) and is built with a public telephone network, the Ethernet (registered trademark), a wireless communication network or the like.

The supply-demand planning device 23 creates a plan for output and power demand (hereinafter "optimal supply-demand plan") so that the cost for generating electricity is minimized during a predetermined period (24 hours in the present embodiment). The supply-demand planning device 23 performs simulations on amount of electrical power generated by hydroelectric power generation (hereinafter "hydroelectric output"), amount of electrical power generated by thermal power generation (hereinafter "thermal output"), amount of electrical power consumed to charge rechargeable batteries (hereinafter "charge demand") and amount of electrical power consumed by loads other than the rechargeable battery 25, to minimize 24-hour power generation cost. The supply-demand planning device 23 can calculate the optimal supply-demand plan based on, for example, a method described in the NPL 1. Note that, in NPL 1, the optimal supply-demand plan is calculated on the premise that the hydroelectric output and the power demand is given, however, the supply-demand planning device 23 of the present embodiment is assumed to be capable of calculating the optimum value of hydroelectric output and demand for power in addition to thermal output by, for example, such as varying the hydroelectric output and demand for power. The supply-demand planning device 23 increases or decreases the hourly amount of electric power demand, hydroelectric output and thermal output according to various factors such as for example, hourly power price for a unit amount of electrical power at the electric power exchange or expenses for starting up the generator for thermal power generation (start-up cost), constraints associated with the rechargeable battery 25, constraints associated with loads besides the rechargeable battery 25, constraints associated with power generation by those besides thermal power generation, and the like. And the supply-demand planning device 23 calculates the unit cost for power generation (hereinafter "unit power generation cost"), and further calculates the power generation expenses by multiplying the total output by the unit power generation cost and counting the result for 24 hours. Thereafter the supply-demand planning device 23 calculates the hydroelectric output (hereinafter "optimal output"), thermal output, output besides those by hydraulic power and thermal power, charge demand (hereinafter "optimal demand"), electrical power consumed by other loads and the like to minimizes the power generation expenses. Note that, in the present embodiment, the unit power generation cost is assumed to be the power price, however, profit may be added to the unit power generation cost to be set as the power price. The supply-demand planning device 23 is, for example, a personal computer or a workstation, a mobile phone unit, PDA (Personal Digital Assistant) and the like. Further, the supply-demand planning device 23 and the later-described economical load distribution adjusting device 10 may be implemented by a single computer.

The water level planning device 21 (corresponds to the "hydroelectric power generation planning device" of the present invention) plans the water level of the reservoir (hereinafter "optimal water level plan") so that the selling price of power generated by hydroelectric power generation is maximized while satisfying the various limiting conditions. The methods disclosed in, for example, PTL 1 can be used for planning the water level plan by the water level planning device 21. As the limiting conditions associated to hydroelectric power generation, there are, for example, the minimum amount of water provided (water intake) to the power generator (hereinafter "minimum water intake"), maximum amount of water intake (hereinafter "maximum water intake") and the like. The water level planning device 21 also calculates the hourly hydroelectric output (hereafter "planned output") in the optimal water level plan. In the present embodiment, the water level planning device 21 is assumed to be provided hourly power prices for calculating the optimal water level plan according to the provided power price. Note that, the power price may be set by adding the profit to the aforementioned unit power generation cost. The water level planning devices 21 are computers provided to each hydroelectric power station and are, for example, a personal computer or a workstation, a mobile phone unit, PDA (Personal Digital Assistant) and the like.

The charge control device 22 (corresponding to the "demand planning device" of the present invention) makes a charging plan (hereinafter "optimal charging plan") for the rechargeable batteries 25 so that the electric power expense for charging is minimized while satisfying the various limiting conditions. As the limiting conditions associated with the rechargeable battery 25, there are for example, the minimum amount of power that can be carried to the rechargeable batteries 25 (hereinafter "minimum carried current") or maximum amount thereof (hereinafter "maximum carried current") and the minimum and maximum capacities of the rechargeable battery 25. The charge control device 22 is also provided hourly power prices for calculating the optimal charging plan according to the provided power price. Additionally, the charge control device 22 also calculates the hourly power demand in the optimal charging plan (hereinafter "planned demand"). The charge control device 22 is a computer provided for each rechargeable battery 25 of the power demander. The charge control device 22 may be, for example, a charger connected to the rechargeable batteries 25 or may be a personal computer and a PDA that are connected to the charger to control the operation of the charger.

The economical load distribution adjusting device 10 makes adjustments so that the water level planning of the reservoir and the charging plan for the rechargeable batteries are performed to agree with the optimal supply-demand plan calculated by the supply-demand planning device 23 as much as possible. If there is a time period when the total amount of planned output that the water level planning devices 21 have planned is greater than the optimal output in the optimal supply-demand plan, the economical load distribution adjusting device 10 reduces the power price of that time period and makes the water level planning device 21 recalculates the water level plan. Since the water level planning device 21 plans the water level to maximize the selling price of power, the plan is expected to be corrected so that the output during the time period with the reduced power price is cut down. In this way, the output can be brought close to the optimal supply-demand plan. Further, if there is a time period when the planned demand that the charge control device 22 have planned is greater than the optimal demand in the optimal supply-demand plan, the economical load distribution adjusting device 10 raises the power price of that time period and makes the charge control device 22 recalculate the charging plan. Since the charging plan is calculated to minimize the expenses for consumed electric power at the charge control device 22, the charging plan is expected to be corrected so that the electrical power consumed during the time period with increased power price is cut down. In this way, the electric power demand can be brought close to the optimal supply-demand plan.

Details will be given hereunder.

Charge Control Device 22

Figure 2:
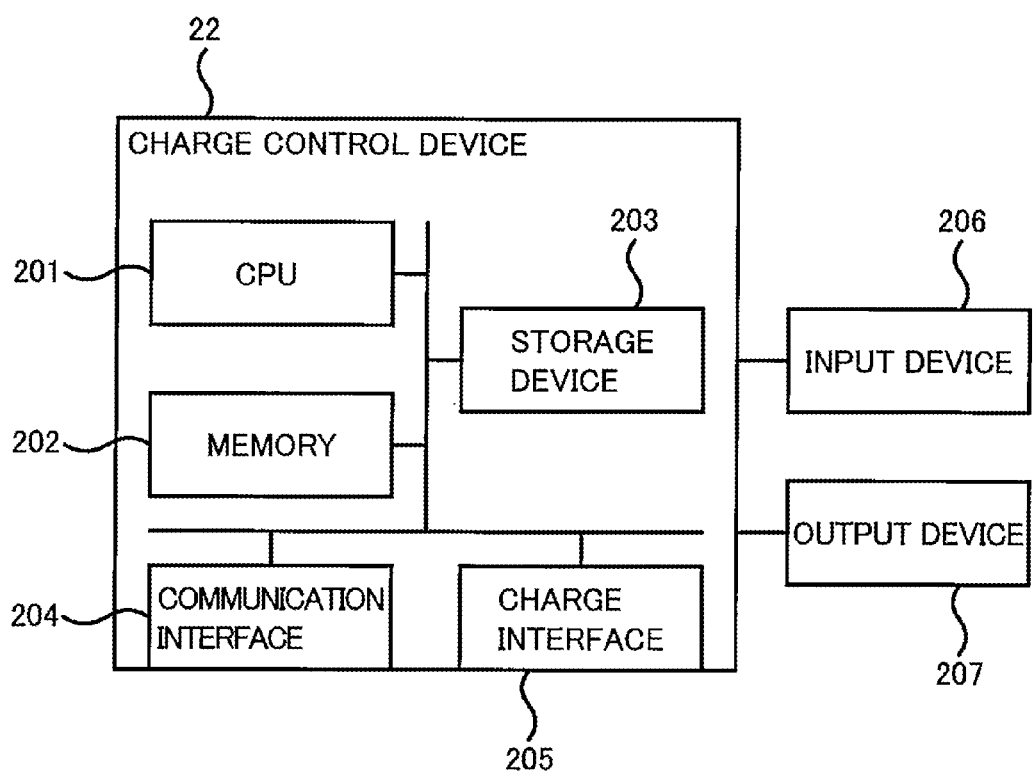
FIG. 2 is a diagram showing the hardware configuration of the charge control device 22.

FIG. 2 is a diagram showing the hardware configuration of the charge control device 22. The charge control device 22 includes a CPU 201, a memory 202, a storage device 203, a communication interface 204, a charge interface 205, an input device 206 and an output device 207. The storage device 203 is, for example, a hard disk drive, a flash memory and the like that stores various data and programs. The CPU 201 accomplishes various functions by reading programs stored in the storage device 203 to the memory 202 and executing the same. The communication interface 204 is an interface for connecting to the communication network 24 and is for example, an adapter for connecting to the Ethernet (registered trademark), a modem for connecting to a telephone network, a wireless communication device for connecting to a wireless communication network and the like. The charge interface 205 is an interface for connecting to a rechargeable battery 25, commercial power source (not shown) and the like. The charge control device 22 charges the rechargeable battery 25 from the commercial source through the charge interface 205. The input device 206 is, for example, a keyboard, a touch screen, a mouse, a microphone and the like that receives data inputs from the user. The output device 207 is, for example, a display, a printer, a speaker and the like that outputs data.

Figure 3:
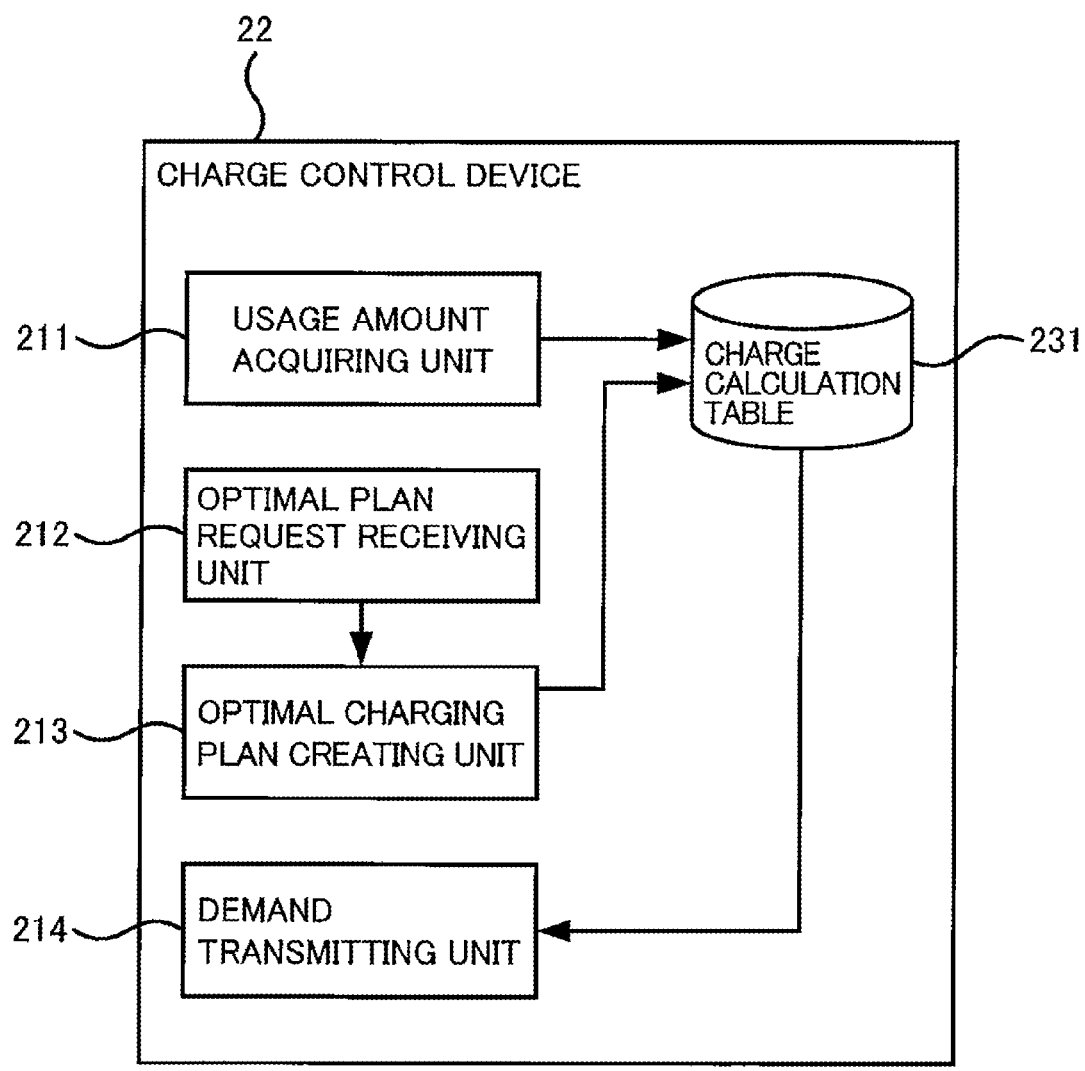
FIG. 3 is a diagram showing the software configuration of the charge control device 22.

FIG. 3 is a diagram showing the software configuration of the charge control device 22. The charge control device 22 includes a usage amount acquiring unit 211, an optimal plan request receiving unit 212, an optimal charging plan creating unit 213, a demand transmitting unit 214, and a charge calculation table 231. Note that, the usage amount acquiring unit 211, the optimal plan request receiving unit 212, the optimal charging plan creating unit 213 and the demand transmitting unit 214 are implemented by the CPU 201 included in the charge control device 22 reading programs stored in the storage device 203 to the memory 202 and executing the same. And the charge calculation table 231 is implemented as a part of the storage area provided by the memory 202 and the storage device 203 included in the charge control device 22.

The charge calculation table 231 stores information relating to charge of the rechargeable battery 25. FIG. 4 is a diagram showing the configuration of the charge calculation table 231. As shown in FIG. 4, the charge calculation table 231 of the present embodiment includes items of minimum capacity 2311, maximum capacity 2312, charge amount 2313, usage amount 2314, minimum carried current 2315, maximum carried current 2316, carried current 2317, power price 2318, and electric power expense 2319 for each time period. The minimum capacity 2311 and the maximum capacity 2312 are the minimum and maximum values of capacity that the rechargeable battery 25 can store, and the minimum carried current 2315 and the maximum carried current 2316 are minimum and maximum values of the amount of power per hour that can be carried to the rechargeable battery 25. The minimum capacity 2311, the maximum capacity 2312, the minimum carried current 2315 and the maximum carried current 2316 are limiting conditions relating to the charge of the rechargeable battery 25. The carried current 2317 is the amount of power fed to charge the rechargeable battery 25 and the usage amount 2314 is the amount of power scheduled to be discharged from the rechargeable battery 25. The charge amount 2313 is the volume charged to the rechargeable battery 25 and is obtained by subtracting the usage amount 2314 from the charge amount 2313 of an hour prior, and adding the provided amount 2317. The power price 2318 is the power price per unit volume supplied from the economical load distribution adjusting device 10. The electric power expense 2319 is the product of the carried current 2317 and the power price 2318. Note that, in the example shown in FIG. 4 24 hours from 8 o'clock to 8 o'clock of the following day is used as the unit of the optimal charging plan, however, any time can be set as the starting point. The starting point ("8 o'clock" in the example of FIG. 4) is indicated as "1" and the end time ("8 o'clock" of the following day in the example of FIG. 4) is indicated as "24" in the following description.

The usage amount acquiring unit 211 acquires the amount of power scheduled for usage from the rechargeable battery 25. The usage amount acquiring unit 211 of the present embodiment acquires actual values of the amount of power discharged from the rechargeable battery 25 for each hour between a particular time period of the previous day (e.g. 8 a.m.) and the same time period of this day (8 a.m.), as scheduled usage for the same time period of the following day (each hour from 8 a.m. to 8 a.m. of the day after next). Note that the usage amount acquiring unit 211 may receive an input of the scheduled usage from a user or predict the future usage amount based on the past actual values and set the predicted value as the scheduled usage. The usage amount acquiring unit 211 uses the acquired scheduled usage to set as the usage amount 2314 in the charge calculation table 231.

The optimal plan request receiving unit 212 receives a command (hereinafter, "optimal plan request") instructing to perform an optimization calculation, sent from the economical load distribution adjusting device 10. Hourly power price is included in the optimal plan request and the optimal plan request receiving unit 212 sets the power price included in the optimal plan request as the power price 2318 in the charge calculation table 231. Additionally, a limiting condition may be included in the optimal plan request and in such a case, the optimal plan request receiving unit 212 sets the limiting condition included in the optimal plan request to the charge calculation table 231. Note that the limiting condition has set any one of the minimum capacity 2311, the maximum capacity 2312, the minimum carried current 2315 and the maximum carried current 2316 in the present embodiment.

The optimal charging plan creating unit 213 determines the carried current 2317 so that the electric power expense relating to charging becomes minimum while satisfying the limiting condition, and the demand transmitting unit 214 sends the carried current prepared by the optimal charging plan creating unit 213 to the economical load distribution adjusting device 10.

Figure 5:
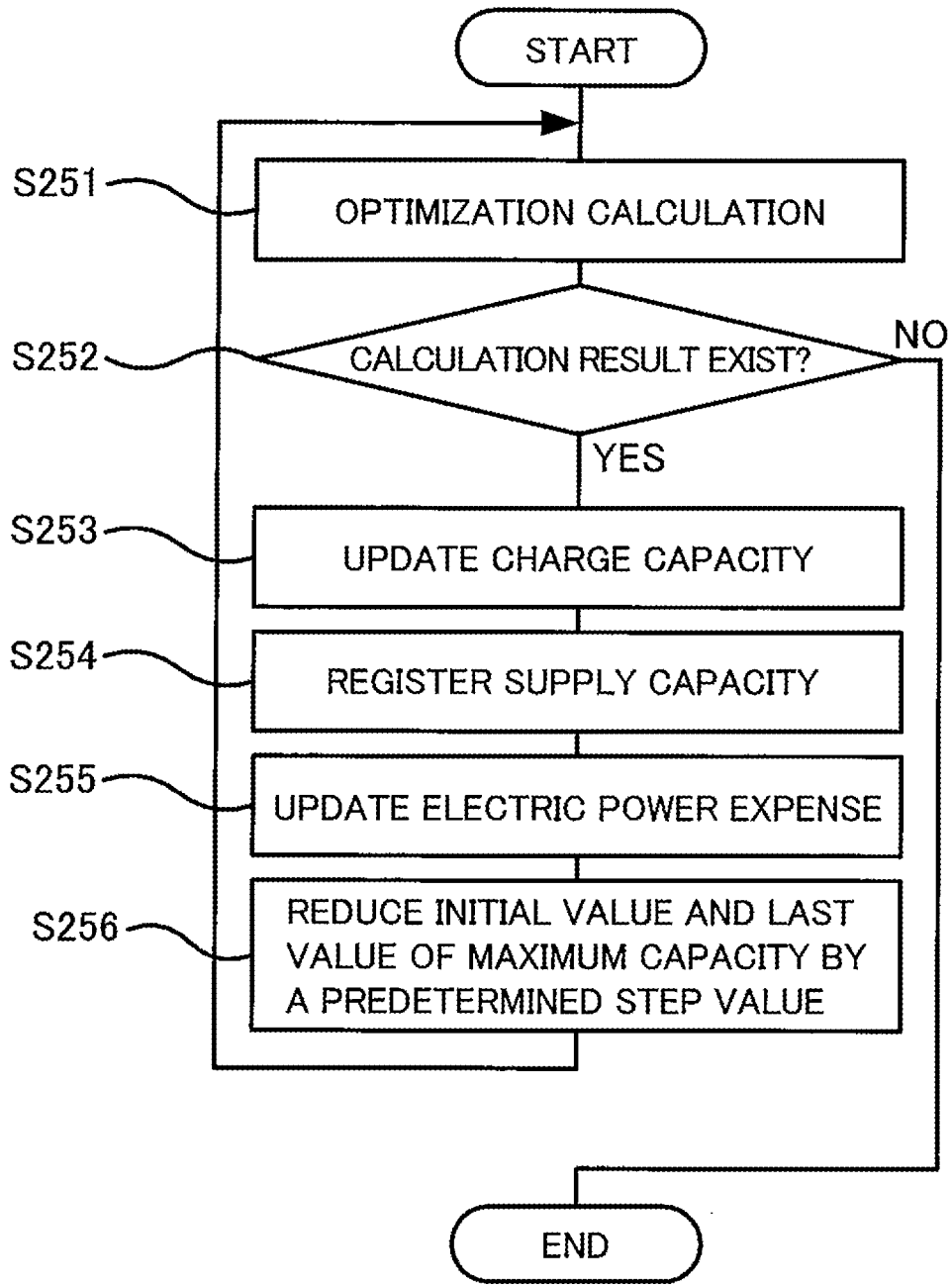
FIG. 5 is a diagram showing the process flow for creating the optimal charging plan.

FIG. 5 is a diagram showing the process flow for creating the optimal charging plan. Note that the optimal charging plan creating unit 213 receives an input of the limiting condition (the minimum capacity 2311, the maximum capacity 2312, the minimum carried current 2315, the maximum carried current 2316) in advance to set in the charge calculation table 231, and the optimal plan request receiving unit 212 updates the charge calculation table 231 using the limiting condition when a limiting condition is included the optimal plan request. Note that the minimum capacity 2321 is not updated at the final time point.

The optimal charging plan creating unit 213 performs an optimization calculation (S251) by calculating the following formulas (1) through (3) while varying the charge amount (t) at time t $$(\text{electric power expense})_t = (\text{carried current})_t * (\text{power price})_t \tag{1}$$

$$(\text{charge amount})_{t+1} = (\text{charge amount})_t + (\text{carried current})_t \tag{2}$$

$$\Sigma\{(\text{electric power expense})_t\} = \Sigma[\{(\text{charge amount})_{t+1} - (\text{charge amount})_t + (\text{usage amount})_t\} * (\text{power price})_t] \tag{3}$$

and determines a combination of (charge amount)$_t$ that gives the minimum total power expense value ((power expense)$_t$) that satisfies the following limiting conditions (4) and (5).

$$(\text{minimum capacity})_t \leq (\text{charge amount})_t \leq (\text{maximum capacity})_t \tag{4}$$

$$(\text{minimum carried current})_t \leq (\text{carried current})_t \leq (\text{maximum carried current})_t \tag{5}$$

When the optimal charging plan creating unit 213 succeeds in calculating the aforementioned combination of the (charge amount)$_t$ (S252:YES), sets the calculated charge amount to the charge amount 2313 in the charge calculation table 131 (S253), calculates the carried current using the above formula (2) to set in the carried current 2317 (254), and sets the calculated electric power expense to the electric power expense 2319 (S255).

The optimal charging plan creating unit 213 subtracts a predetermined step value from each of the initial value 2322 and the end value 2323 of the maximum capacity 2312 (S256) and repeats the processes from step S251.

As explained above, the optimal charging plan creating unit 213 can determine a combination of the (charge amount)$_t$s that has the least charge amount as well as minimizes the total electric power expense among the combinations that has charge amounts at the start and the end points of the plan that are the same, and the (charge amount)$_t$ at each time point t during the plan are equal to or greater than the (minimum capacity)$_t$ and equal to or less than the (maximum capacity)$_t$. Therefore, needless charging can be avoided thus enabling to extend the life of such as a lithium ion rechargeable battery 25. Also, charging can performed so to minimize the electric power expense after securing the required charge amount. Note that the optimal charging plan creating unit 213 may, for example, vary the energization time or the output (output value) from the charge control device 22 to the rechargeable battery 25, and determine the energization time or the output value that minimizes the total electric power expense using the following formula:

$$\Sigma\{(\text{electric power expense})_t\} = \Sigma[\{(\text{energization time})_t * (\text{output value})_t * (\text{power price})_t\}.$$

Economical Load Distribution Adjusting Device 10

Figure 6:
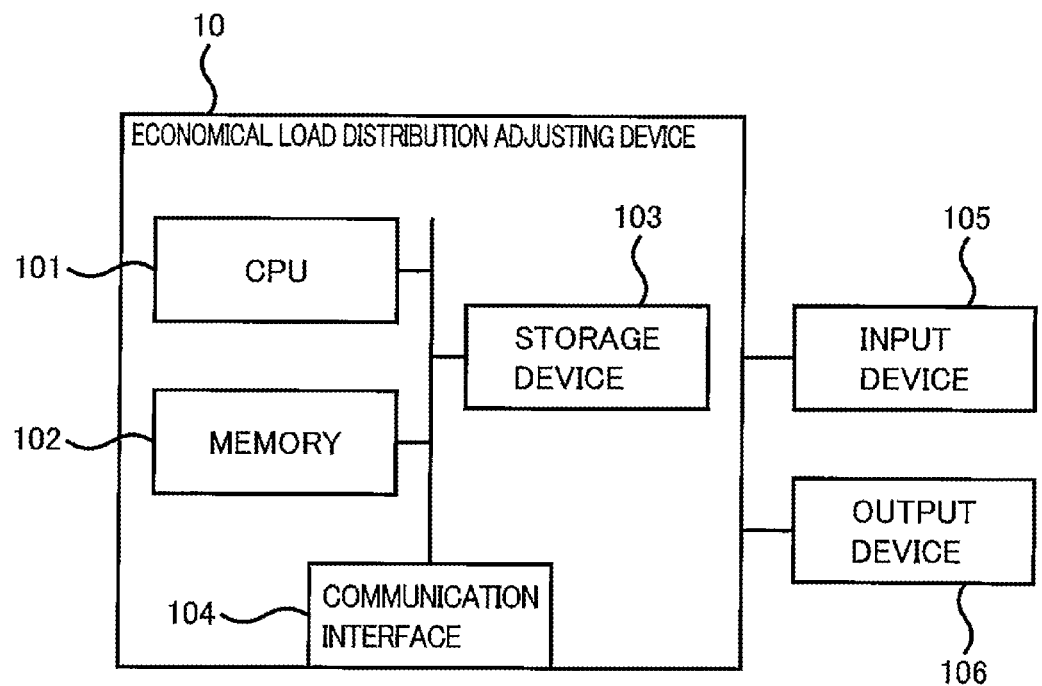
FIG. 6 is a diagram showing the hardware configuration of the economical load distribution adjusting device 10.

FIG. 6 is a diagram showing the hardware configuration of the economical load distribution adjusting device 10. The economical load distribution adjusting device 10 includes a CPU 101, a memory 102, a storage device 103, a communication interface 104, an input device 105 and an output device 106. The storage device 103 is, for example, a hard disk drive, a flash memory and the like that stores various data and programs. The CPU 101 implements various functions by reading programs stored in the storage device 103 to the memory 102 and executing the same. The communication interface 104 is an interface for connecting to the communication network 24 and is for example, an adapter for connecting to the Ethernet (registered trademark), a modem for connecting to a telephone network, a wireless communication device for connecting to a wireless communication network and the like. The input device 105 is, for example, a keyboard, a mouse, a microphone and the like that receives data inputs from the user. The output device 106 is, for example, a display, a printer, a speaker and the like that outputs data.

Figure 7:
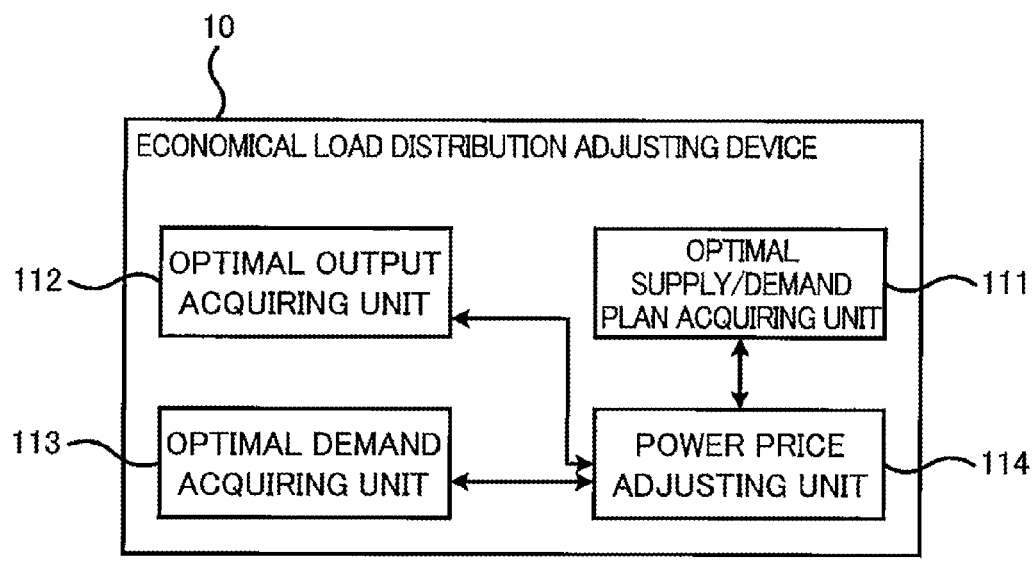
FIG. 7 is a diagram showing the software configuration of the economical load distribution adjusting device 10.

FIG. 7 is a diagram showing the software configuration of the economical load distribution adjusting device 10. The economical load distribution adjusting device 10 includes function units of an optimal supply-demand plan acquiring unit 111, an optimal output acquiring unit 112, an optimal demand acquiring unit 113 and a power price adjusting unit 114. Note that, the above functions are accomplished by the CPU 101 included in the economical load distribution adjusting device 10 reading programs stored in the storage device 103 to the memory 102 and executing the same.

The optimal supply-demand plan acquiring unit 111 acquires an optimal supply-demand plan calculated by the supply-demand planning device 23. In the present embodiment, the optimal supply-demand plan acquiring unit 111 sends a command instructing to perform an optimal plan request to the supply-demand planning device 23, the supply-demand planning device 23 calculates an optimal supply-demand plan in accordance with the optimal plan request, makes a response indicating the optimal power price, optimal demand and optimal output to the economical load distribution adjusting device 10 to be received by the optimal supply-demand plan acquiring unit 111.

The optimal output acquiring unit 112 acquires the hourly planned outputs in the optimal water level plan calculated by the water level planning devices 21. In the present embodiment, the optimal output acquiring unit 112 sends to the water level planning devices 21 an optimal plan request including the hourly optimal power price acquired from the supply-demand planning device 23. The water level planning devices 21 calculates the optimal water level plan according to the optimal plan request, makes a response indicating the hourly planned output in the optimal water level plan to the economical load distribution adjusting device 10 to be received by the optimal output acquiring unit 112.

The optimal demand acquiring unit 113 acquires the hourly planned demand in the optimal charging plan calculated by the charge control devices 22. In the present embodiment, the optimal demand acquiring unit 113 sends the optimal plan request including the hourly optimal power price acquired from the supply-demand planning device 23 to the charge control devices 22. The charge control devices 22 calculate the optimal charging plan according to the optimal plan request, makes a response indicating the hourly planned demand in the optimal charging plan to the economical load distribution adjusting device 10 to be received by the optimal demand acquiring unit 113.

The power price adjusting unit 114 makes the water level planning devices 21 recalculate so that the hydroelectric outputs acquired from the water level planning devices 21 agree as much as possible with the optimal supply-demand plan. The power price adjusting unit 114 also makes the charge control devices 22 recalculate so that the charge demand acquired from the charge control devices 22 agrees as much as possible with the optimal supply-demand plan. In the present embodiment, the power price adjusting unit 114 adjusts the power price of the time period during which the total amount of planned output acquired from the water level planning devices 21 exceeds the optimal output included in the optimal supply-demand plan so to become lower than the current power price, and sends the optimal plan request including the adjusted power price to the water level planning devices 21 for recalculation thereby. Further, the power price adjusting unit 114 adjusts the power price for the time period during which the total amount of planned demand acquired from the charge control devices 22 exceeds the optimal demand included in the optimal supply-demand plan so to become higher than the current power price, and sends the optimal plan request including the adjusted power price to the charge control devices 22 for recalculation thereby.

Process Flow Scheme

Figure 8:
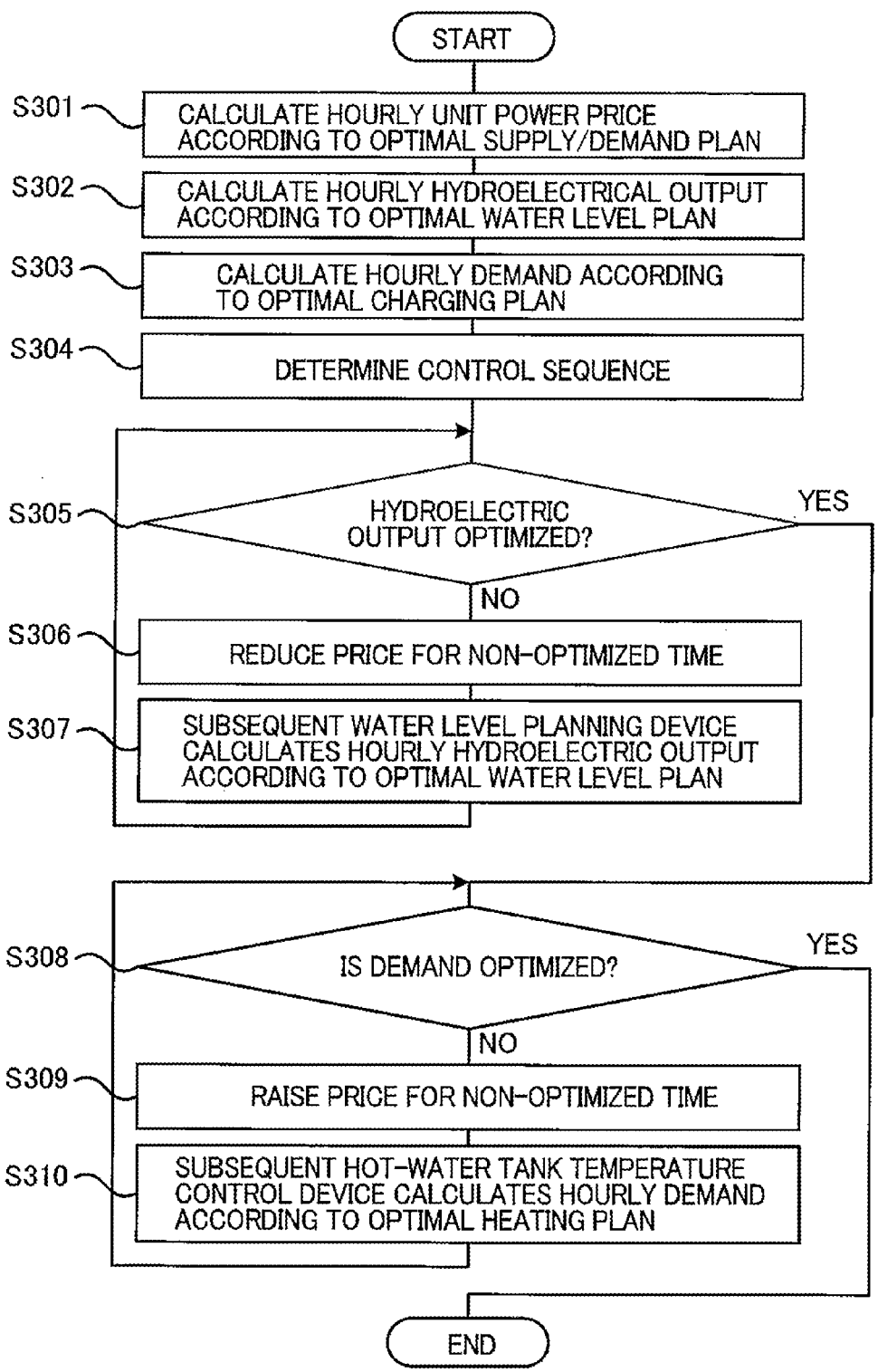
FIG. 8 is a diagram explaining the process flow scheme of the economical load distributing system.

FIG. 8 is a diagram explaining the process flow scheme of the economical load distributing system.

The supply-demand planning device 23 calculates the optimal supply-demand plan (S301), the water level planning devices 21 calculate the hourly planned output according to the optimal water level plan (S302), and the charge control devices 22 calculate the hourly planned output according to the optimal charging plan (S303). The economical load distribution adjusting device 10 determines the sequences of the water level planning devices 21 (power plants) and the charge control devices 22 (rechargeable batteries) to be adjusted (S304). Note that, the way in which the sequence is determined will be explained later.

When there is a time period at which the planned output received from the water level planning devices 21 exceeds the optimal output (S305: NO), the economical load distribution adjusting device 10 lowers the power price for such time period (S306) and the water level planning devices 21 recalculates the planned output according to the optimal water level plan (S307).

The process proceeds to step S308 at any time if the planned output does not exceed the optimal output (S305: YES). If there is a time period at which the planned demand received from the charge control devices 22 exceeds the optimal demand (308: NO), the economical load distribution adjusting device 10 raises the power price for that time period (S309) and the charge control devices 22 recalculate the planned demand according to the optimal charging plan (S310).

Figure 9:
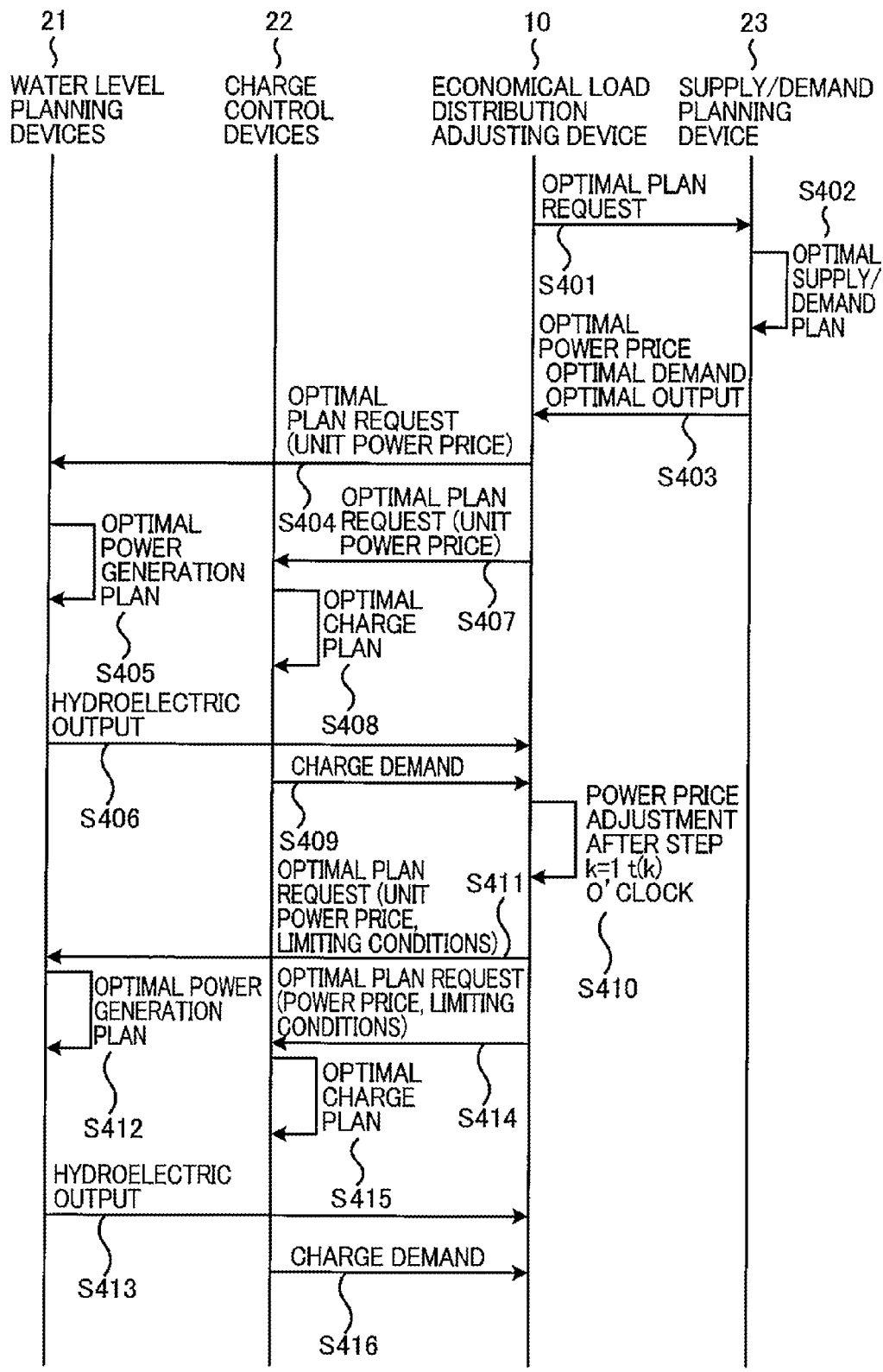
FIG. 9 is a diagram explaining the manner in which data is sent and received during the processes in FIG. 8.

FIG. 9 is a diagram explaining the manner in which data is sent and received during the processes in FIG. 8.

Steps S401-S403 correspond to step S301 in FIG. 8. The economical load distribution adjusting device 10 sends an optimal plan request to the supply-demand planning device 23 (S401). The supply-demand planning device 23 performs simulations in response to the optimal plan request to calculate the optimal supply-demand plan (S402) and sends hourly optimal power prices, optimal demand and optimal output in the optimal supply-demand plan to the economical load distribution adjusting device 10 (S403).

Steps S404-S406 correspond to step S302 in FIG. 8. The economical load distribution adjusting device 10 includes the optimal power price received from the supply-demand planning device 23 into the optimal plan request to send to each of the water level planning devices 21 (S404). Each of the water level planning devices 21 uses the power price included in the optimal plan request to create an optimal water level plan so that the selling price of hydroelectric output is maximized (S405) and returns the planned output associated with the optimal water level plan to the economical load distribution adjusting device 10 (S406).

Steps 407-S409 correspond to step S303 in FIG. 8. The economical load distribution adjusting device 10 includes the optimal power price received from the supply-demand planning device 23 into the optimal plan request to send to each of the charge control devices 22 (S407). Note that, the economical load distribution adjusting device 10 may be made to send the optimal plan request to the charge control devices 22 before step 404 when the optimal plan request is sent to the water level planning devices 21. The charge control devices 22 use the optimal power price included in the optimal plan request to create an optimal charging plan so that the electric power expense for charging is minimized (S408) and sends an hourly planned demand in the optimal charging plan to the economical load distribution adjusting device 10 (S409).

Step 410 corresponds to steps S306 and S309 in FIG. 8. The economical load distribution adjusting device 10 reduces the power price of the time period when the planned output exceeds the optimal output and raises the power price of the time period when the planned demand exceeds the optimal demand, for time period after time period t(k) corresponding to the repeated number of times k of the processes indicated in steps S305-S307 or steps S308-S310 in FIG. 8 (S410). The economical load distribution adjusting device 10 can set, for example, a predetermined minimum value to the power price of the time period when the planned output exceeds the optimal output and a predetermined maximum value to the power price of the time period when the planned demand exceeds the optimal demand.

Steps S411-S413 correspond to steps S305 and S307 in FIG. 8. The economical load distribution adjusting device 10 sets a limiting condition (hereinafter "limiting condition for power generation adjustment") so that generated power does not vary during the adjusted time periods. For example, the economical load distribution adjusting device 10 coverts the amount of generated power to amount of water intake for time period at which the price is already adjusted and sets the amount of water intake for both the minimum water intake and maximum water intake as the limiting conditions for power generation adjustment. The economical load distribution adjusting device 10 sends an optimal plan request including the reduced power price and the limiting conditions for power generation adjustment to the water level planning devices 21 (S411). The water level planning devices 21 uses the power price and the limiting conditions for power generation adjustment included in the optimal plan request to recreate an optimal water level plan that maximizes the selling price of hydroelectric power while satisfying the limiting conditions for power generation adjustment in addition to the normal limiting conditions (S412). In this way, the amount of water intake does not vary for time period when the price is adjusted since the minimum water intake and the maximum water intake are the same, in other words, the amount of power generation can be kept from varying. And at the same time, for the remaining time, the water level planning devices 21 can lead such that the amount of generated power is expected to be adjusted to reduce the output during time at which the price is lowered. The water level planning devices 21 sends hourly planned output in the optimal water level plan to the economical load distribution adjusting device 10 (S413).

Steps S414-S416 correspond to steps S308 and S310 in FIG. 8. The economical load distribution adjusting device 10 sets a limiting condition (hereinafter "demand adjusting limiting condition") so that the amount of demand during the adjusted time period does not vary. For example, the economical load distribution adjusting device 10 converts the amount of demand during the price adjusted time period into an amount of carried current and sets the amount of carried current to both the minimum carried current and a maximum carried current as the demand adjusting limiting conditions. The economical load distribution adjusting device 10 sends an optimal plan request including the raised power price and the demand adjusting limiting conditions to the charge control devices 22 (S414). The charge control devices 22 use the power price and the demand adjusting limiting conditions included in the optimal plan request to create an optimal charging plan so that the electric power expense for charging is minimized while satisfying the demand adjusting limiting conditions in addition to the normal limiting conditions (S415). In this way, the carried current does not vary since the minimum carried current and the maximum carried current are the same for the time at which the price is adjusted, in other words, the amount of demand can be kept from varying. And at the same time, for the remaining time period, the charge control devices 22 can lead such that the amount of demand is expected to be adjusted to reduce the demand during time period at which the price is raised. The charge control devices 22 send hourly planned demand in the optimal charging plan to the economical load distribution adjusting device 10 (S416).

The economical load distribution adjusting device 10 repeats the processes from step S410 to step S416 until the planned output is equal to or less than the optimal output and the planned demand is equal to or less than the optimal demand for all the time, or the optimal water level plan and the optimal charging plan are recreated for all the water level planning devices 21 and all the charge control devices 22.

In the foregoing manner, the optimal water level plan and the optimal charging plan are adjusted in each of the water level planning devices 21 and each of the charge control devices 22 so that the optimal output and the optimal demand in the optimal supply-demand plan are reached as much as possible.

Adjustment of Power Prices

Hydroelectric Power Plant

Figure 10:
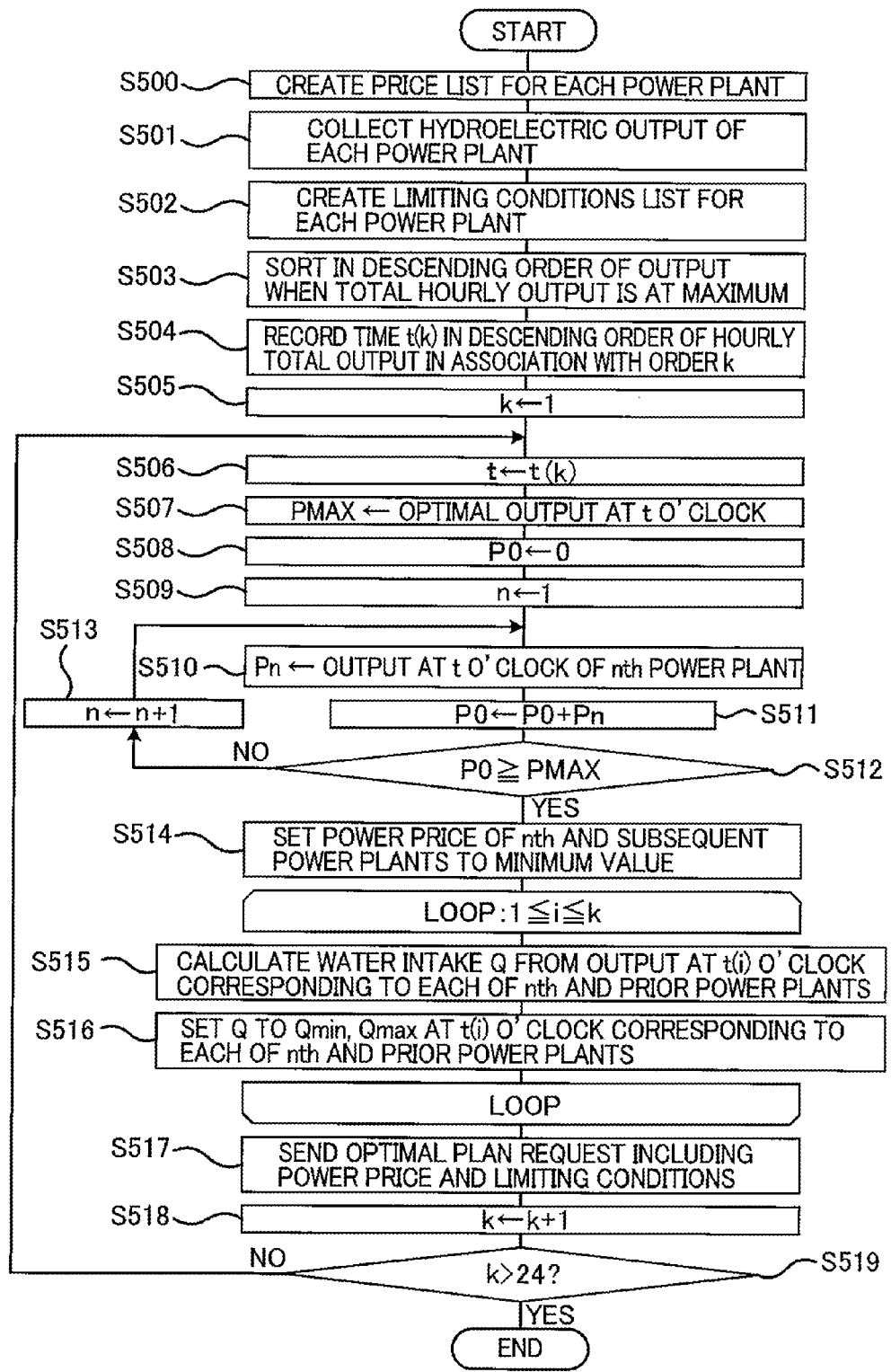
FIG. 10 is a diagram explaining the flow of the power price adjustment process to be sent to the water level planning device 21.

FIG. 10 is a diagram explaining the flow of the adjustment process of the power price to be sent to the water level planning device 21 of step S306 in FIG. 8 and step S410 in FIG. 9.

The economical load distribution adjusting device 10 creates a price list 61 that stores the optimal power prices received from the supply-demand planning device 23 in association with the hydroelectric power plants (S500). FIG. 11 is a table showing an example of the price list 61. In the present embodiment, the price list 61 stores therein the prices with the hydroelectric power plants in the column direction and time in the row direction. The economical load distribution adjusting device 10 creates an output list 62 that stores hourly planned output received from the water level planning devices 21 for each hydroelectric power plant (S501). FIG. 12 is a table showing an example of an output list 62. In the present embodiment, the output list 62 also stores hydroelectric output with the hydroelectric power plants in the column direction and time period in the row direction. Further, the economical load distribution adjusting device 10 sums up the planned output corresponding to each hydroelectric power plant for each time period to be set in the hourly total column 621 of the output list 62. Furthermore, the economical load distribution adjusting device 10 creates a limiting conditions list 63 that stores limiting conditions of each time for each power plant and sets the limiting conditions as the initial values (S502). FIG. 13 is a table showing an example of the limiting conditions list 63. Note that, in the present embodiment, the limiting conditions assume only the minimum water intake (Qmin) and maximum water intake (Qmax). Additionally, the initial values of the limiting conditions for all the hydroelectric power plants take the same value.

The economical load distribution adjusting device 10 specifies the beginning of time when the hourly total is maximized and sorts the columns of the price list 61 and the output list 62 in descending order of output of hydroelectric power plants at that time (S503). FIGS. 14 and 15 show an example where the maximum hourly total of 750 is at 13 o'clock and the columns of the price list 61 and the output list 62 are sorted in accordance with the output at 13 o'clock to be in the order of power plant 5, power plant 4, power plant 3, power plant 2 and power plant 1 from the left. The columns were sorted from the left in the present invention, however, it is a matter of course that the columns may be sorted from the right.

The economical load distribution adjusting device 10 records time t(k) in association with order k in the descending order of hourly totals of the output list 62 in the time table in order of output 64 shown in FIG. 16 (S504). The economical load distribution adjusting device 10 sets 1 to variable k (S505), reads t(k) corresponding to k from the time table in order of output 64 to be set as t (S506). In the example shown in FIG. 16, for example, if k is 1, t(k) would be "13". Note that, in the case there is a plurality of time periods at which the hourly totals are of the same value, the time to be set to t is selected by a predetermined method, for example, selecting the earliest time period and the like. The economical load distribution adjusting device 10 sets the optimal output at time t as PMAX (S507), sets zero to variable P0 (S508) and sets 1 to variable n (S509). The economical load distribution adjusting device 10 adds the hydroelectric output at t o'clock at the $n^{th}$ power plant, in other words, sets the value corresponding to t o'clock of the $n^{th}$ column from the left in the output list 62 to Pn (S510) and adds Pn to P0 (S511).

If P0 is less than PMAX (S512: NO), the economical load distribution adjusting device 10 increments n (S513) and repeats the processes from step S510.

When P0 becomes equal to PMAX or greater (S512: YES), the economical load distribution adjusting device 10 sets the power price of the $n^{th}$ power plant and those subsequent thereto, in other words, the value corresponding to t o'clock of the power plants after the $n^{th}$ one from the left in the price list 61, to a predetermined minimum value (S514). In the example of FIG. 17, the minimum value is assumed to be "0.01". For example, when n is 5 and t is 13, the power price 611 at 13 o'clock becomes 0.01 only for power plant 1.

The economical load distribution adjusting device 10 performs the following processes for variable i starting from 1 and ending with k. The economical load distribution adjusting device 10 reads t(i) from the time table in order of output 64 for the $n^{th}$ and preceding power plants, acquires the output in the output list 62 corresponding to t(i) o'clock and converts the acquired output to water intake Q (S515). As disclosed in PTL 1, for example, equation Pn=Qn*hn*c*g holds true where Pn is the generated amount of electricity, Q is the water intake, hn is the effective drop, c is the coefficient associated to the conversion efficiency and g is the gravitational acceleration. In the present embodiment, the effective drop hn and the coefficient c associated to the conversion efficiency are assumed to take the same value for all the power plants and therefore, the water intake Q may be calculated from the output with the above equation. The economical load distribution adjusting device 10 sets the calculated water intake Q to both the minimum water intake and maximum water intake of the limiting conditions list 63 corresponding to t(i) o'clock for power plants prior to the $n^{th}$ power plant (S516). In this way, the water intake Q at t(i) o'clock is prevented from being varied for the first to $n^{th}$ power plants. And therefore, the output at t(i) o'clock can be prevented from varying when the water level planning devices 21 recalculate the optimal water level plan.

The above processes are repeated for i starting from 1 and ending with k, and the minimum water intake and the maximum water intake corresponding to t(i) o'clock are set with the aforementioned converted water intake for power plants whose power prices are not adjusted. In the example of FIG. 18, the minimum water intake and the maximum water intake at 13 o'clock are set the same values for each of power plant 2 and power plant 5.

The economical load distribution adjusting device 10, for each of the hydroelectric power plants, reads the power price for each time from the price list 61, reads the limiting conditions (minimum water intake and maximum water intake) for each time from the limiting conditions list 63, sends an optimal plan request including the read power price and the limiting conditions to the water level planning devices 21 (S517) and makes the water level planning devices 21 recalculate the optimal water level plan. The economical load distribution adjusting device 10 increments k (S518). The economical load distribution adjusting device 10 repeats the processes from step 506 if the processes for all the times are not performed yet, that is, if k is 24 or less (S519: NO), and terminates the process if k is greater than 24 (S519: YES).

Figure 19:
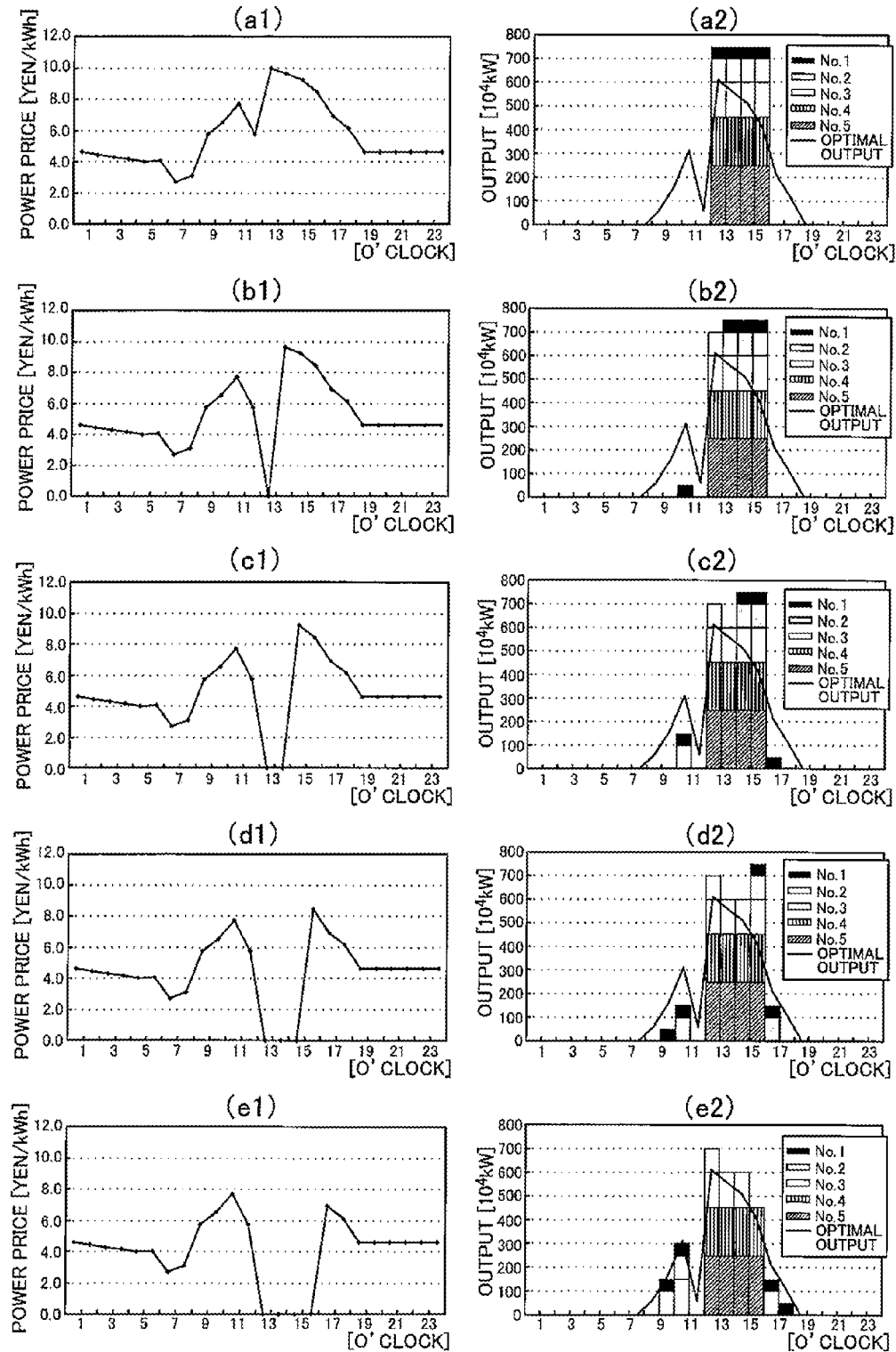
FIG. 19 shows diagrams explaining the power price adjustment processes shown in FIG. 10.

FIG. 19 shows diagrams explaining the power price adjustment processes shown in aforementioned FIG. 10. (a1) shows a graph indicating the optimal power price calculated by the supply-demand planning device 23, (a2) shows a line graph of the optimal output and a stacked bar chart of the planned output calculated by each of the water level planning devices 21 according to the optimal power price. In the example shown in FIG. 19, the total planned output exceeds the optimal output between 13 o'clock and 16 o'clock. When the power price of power plant 1 whose total planned output exceeds the optimal output at 13 o'clock is lowered (b1), the water level planning devices 21 of power plant 1 are expected to increase the outputs at other times to maximize the selling price of power. In the example of (b2), power generation planned at 13 o'clock is shifted to 11 o'clock. The power prices at power plants 1 and 2 are lowered at 14 o'clock (c1) and thereby the water level planning devices 21 of power plant 1 have shifted the power generation planned at 14 o'clock to 17 o'clock and the water level planning devices 21 of power plant 2 have shifted the power generation planned at 14 o'clock to 11 o'clock to maximize the selling price of power (c2). Similarly, the power price at power plant 1 is lowered at 15 o'clock (d1) and the power generation planned at 15 o'clock is shifted to 10 o'clock (d2). The power prices at power plants 1-3 are lowered at 16 o'clock (e1) and the planned outputs at 16 o'clock are shifted to 18 o'clock at power plant 1, shifted to 10 o'clock at power plant 2 and shifted to 11 o'clock at power plant 3 (e2). In this way, power generation plans are laid at (e2) by each of the water level planning devices 21 in conditions approximately agreeing with the optimal output.

As explained above, the economical load distribution adjusting device 10 in the economical load distributing system of the present embodiment can make the water level planning devices 21 recalculate the water level plan after setting the power price, to a minimum value, of a time period where the planned output is greater than the optimal output if such time period exists. Since the water level is planned to maximize the selling price of power by the water level planning devices 21, the plan is expected to be corrected to reduce the output of time periods having the lowered power prices. In this way, the output can be brought close to the optimal supply-demand plan.

Adjustment of Power Price

Rechargeable Battery 25

Figure 20:
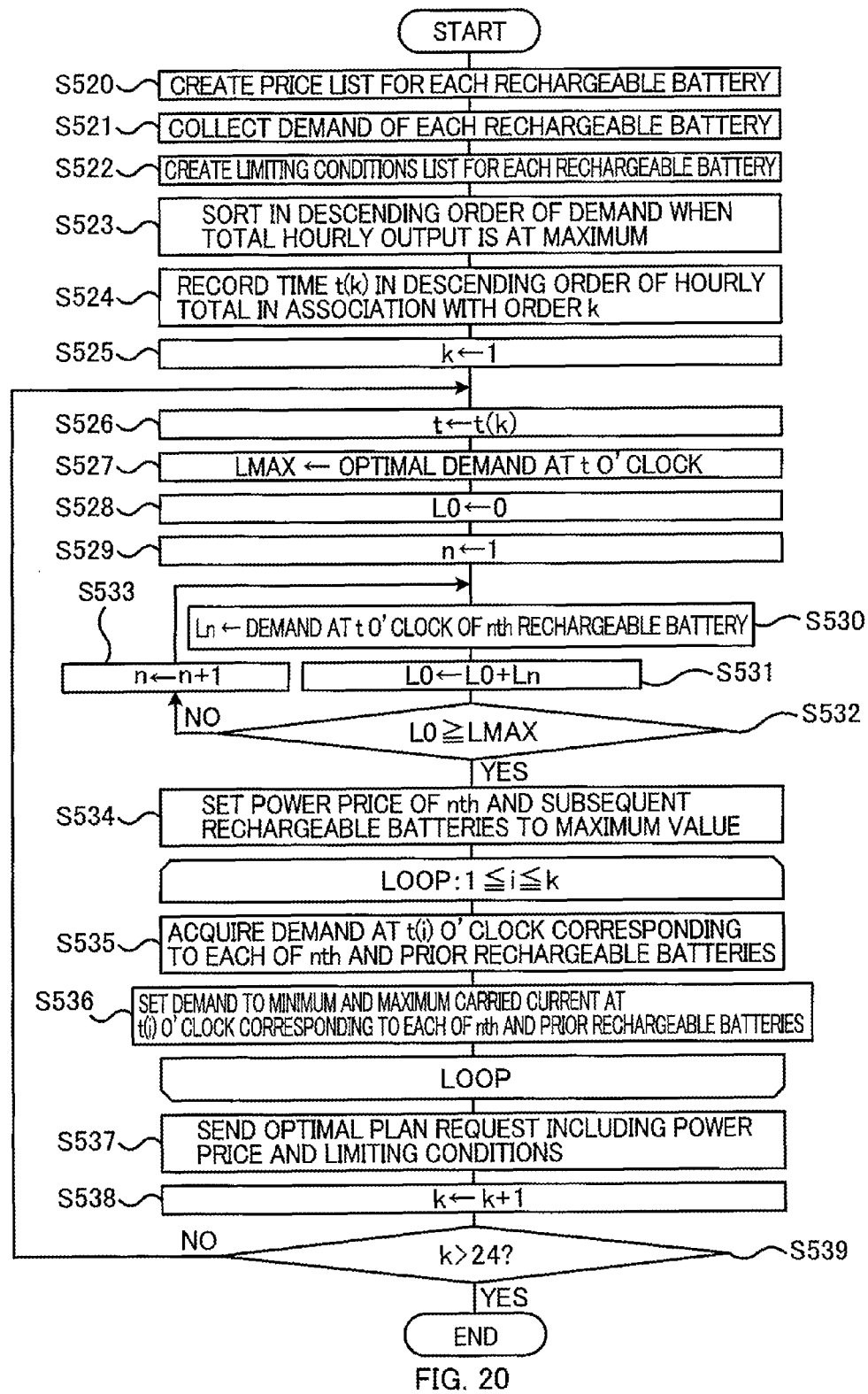
FIG. 20 is a flowchart explaining the adjustment process flow for the power price to be sent to the charge control device 22.

FIG. 20 is a flowchart explaining the adjustment process flow for the power price to be sent to the charge control device 22 in step S309 of FIG. 8 and step S410 of FIG. 9.

The economical load distribution adjusting device 10 creates price list 71 that stores therein the optimal power price received from the supply-demand planning device 23, in association with the rechargeable batteries 25 (S520). In the present embodiment, the price list 71 stores therein the prices with the rechargeable batteries 25 in the column direction and time period in the row direction. The economical load distribution adjusting device 10 creates a demand list 72 that stores for each rechargeable battery 25 the planned demand received from the charge control devices 22 (S521). In the present embodiment, the demand list 72 also stores demand with the rechargeable batteries 25 in the column direction and time period in the row direction. Further, the economical load distribution adjusting device 10 sums up the planned demand corresponding to each rechargeable battery 25 for each time to set in the hourly total column 651 of the demand list 72. Furthermore, the economical load distribution adjusting device 10 creates a limiting conditions list 73 that stores limiting conditions for each time period for each rechargeable battery 25 and sets the limiting conditions as the initial values (S522). FIG. 21 is a table showing an example of the limiting conditions list 73. Note that in the present embodiment, the limiting conditions assume only the minimum capacity and the maximum capacity, and the minimum carried current and the maximum carried current. Additionally, the present embodiment assumes that the economical load distribution adjusting device 10 acquires the limiting conditions from each charge control device 22, however, predetermined initial values may be set to the limiting conditions for all the rechargeable batteries 25, for example.

Figure 23:
FIG. 23 is a table showing an example of the price list 71 after sorting.
Figure 24:
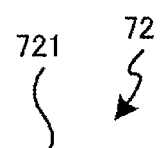
FIG. 24 is a table showing an example of the list of power demand 72 after sorting.

The economical load distribution adjusting device 10 specifies the beginning of time when the hourly total is maximized and sorts the columns of the rechargeable batteries in the price list 71 and the demand list 72 in descending order of demand at that time period (S523). FIGS. 23 and 24 show examples of the price list 71 and the demand list 72 after sorting. In the examples shown in FIGS. 23 and 24, the columns of the price list 71 and the demand list 72 are sorted in the order of rechargeable battery 3, rechargeable battery 1 and rechargeable battery 2 from the left.

The economical load distribution adjusting device 10 records time t (k) in association with order k in descending order of hourly totals of the demand list 62 in the time table in order of demand 74 shown in FIG. 22 (S524). The economical load distribution adjusting device 10 sets 1 to variable k (S525) reads t(k) corresponding to k from the time table in order of demand 74 to set as t (S526). In the example shown in FIG. 24, for example, if the hourly total of "150" at the fifth time period is the maximum value, t would be "5". Note that, in the case there is a plurality of time periods at which the hourly totals are of the same value, the time period to be set to t is selected by a predetermined method, for example, selecting the earliest time period and the like. The economical load distribution adjusting device 10 sets the optimal demand at t o'clock as LMAX (S527), sets zero to variable L (S528) and sets 1 to variable n (S529). The economical load distribution adjusting device 10 adds the planned demand at t o'clock of the $n^{th}$ rechargeable battery 25, in other words sets the value corresponding to t o'clock of the $n^{th}$ column from the left in the demand list 72 to Ln (S530) and adds Ln to L0 (S531).

If L0 is less than LMAX (S532: NO), the economical load distribution adjusting device 10 increments n (S533) and repeats the processes from step S530.

When L0 is LMAX or greater (S532: YES), the economical load distribution adjusting device 10 sets the power price of the $n^{th}$ and its subsequent rechargeable batteries, in other words, the value corresponding to t o'clock of the rechargeable batteries after the $n^{th}$ one from the left in the price list 71 to a predetermined maximum value (S534). In the example of FIG. 25, the maximum value is assumed to be "99". For example, when n is 1 and t is 5, the power price 711 at 5 o'clock becomes 99 for the rechargeable batteries except rechargeable battery 3.

The economical load distribution adjusting device 10 performs the following processes for variable i starting from 1 and ending with k. The economical load distribution adjusting device 10 reads t(i) from the time table in order of demand 74 for the $n^{th}$ and preceding rechargeable batteries 25, acquires the demand in the demand list 72 corresponding to t(i) o'clock (S535). The economical load distribution adjusting device 10 sets the acquired demand to both the minimum carried current and the maximum carried current of the limiting conditions list 73 corresponding to t(i) o'clock for the $n^{th}$ and preceding rechargeable batteries 25 (S536). In this way, the carried current at t(i) o'clock is prevented from being varied for the first to $n^{th}$ rechargeable batteries 25. And therefore, the demand at t(i) o'clock can be prevented from varying when the charge control devices 22 recalculate the optimal charging plan.

The above processes are repeated for i starting from 1 and ending with k, and the acquired demand is set to both the minimum carried current and the maximum carried current corresponding to t(i) o'clock for the rechargeable batteries 25 that do not have the power prices adjusted.

The economical load distribution adjusting device 10, for each of the rechargeable batteries 25, reads the power price for each time from the price list 71, reads the limiting conditions (minimum capacity and maximum capacity, and minimum carried current and maximum carried current) for each time from the limiting conditions list 73, sends the optimal plan request including the read power price and the limiting conditions to the charge control devices 22 (S537) and makes the charge control devices 22 recalculate the optimal charging plan. The economical load distribution adjusting device 10 increments k (S538). The economical load distribution adjusting device 10 repeats the processes from step 526 when the processes for all the times are not performed yet, that is, if k is 24 or less (S539: NO), and terminates the process if k is greater than 24 (S539: YES).

Figure 26:
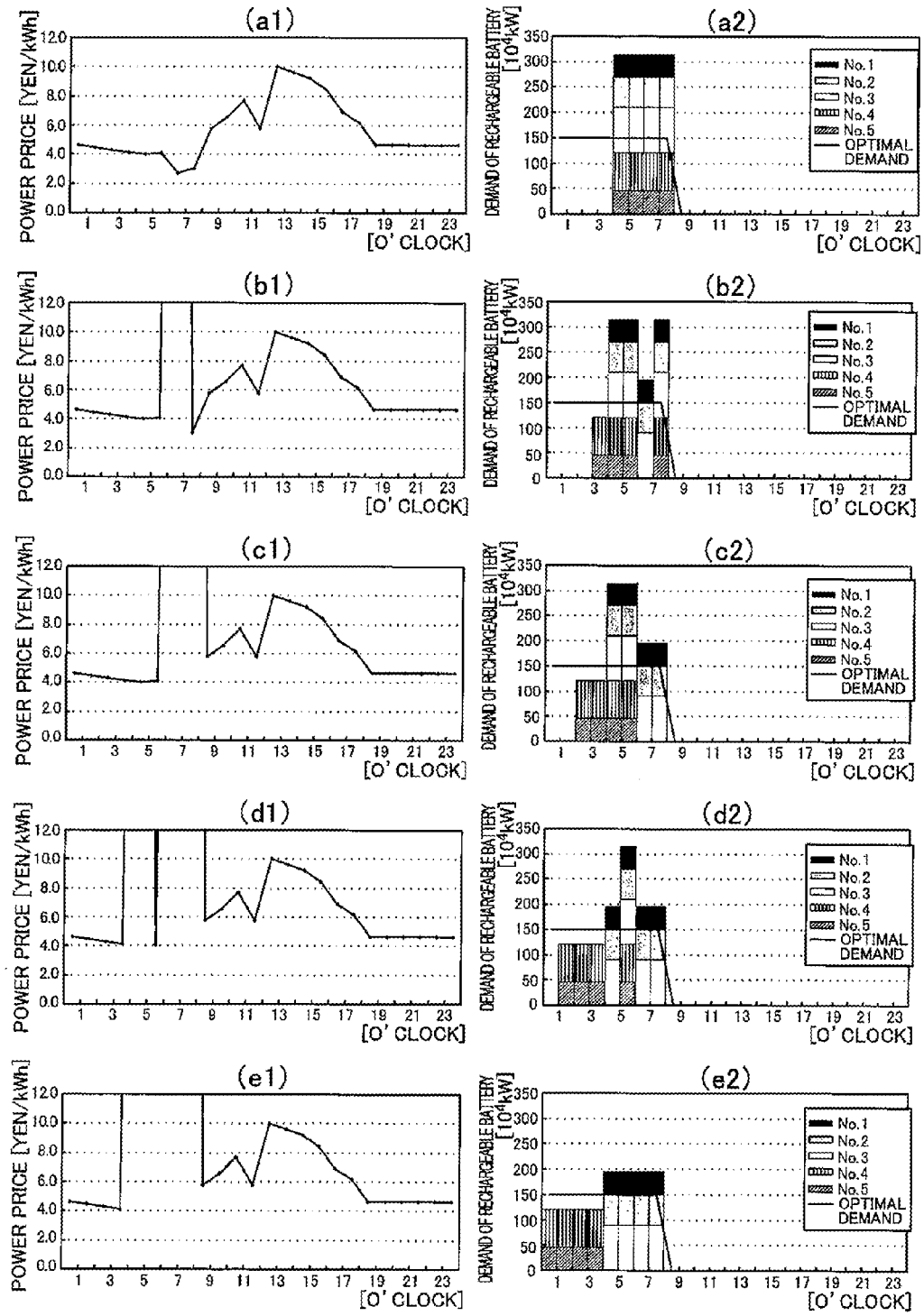
FIG. 26 shows diagrams explaining the power price adjustment process shown in FIG. 20.

FIG. 26 shows diagrams explaining the power price adjustment processes shown in aforementioned FIG. 20. (a1) shows a graph indicating the optimal power price calculated by the supply-demand planning device 23, (a2) shows a line graph of the optimal demand and a stacked bar chart of the planned demand calculated by each of the charge control devices 22 according to the optimal power price. In the example shown in FIG. 26, the total planned demand exceeds the optimal demand between 5 o'clock and 8 o'clock. When the power price of the rechargeable batteries 4 and 5 are raised at 7 o'clock at which the total planned demand exceeds the optimal demand (b1), the charge control devices 22 controlling the rechargeable batteries 4 and 5 are expected to reduce the demand for time at which the power price is raised and to increase the demand at other times to minimize the electric power expense associated with consumed power. In the example of (b2), charge to the rechargeable battery 5 planned at 7 o'clock is shifted to 4 o'clock. The power prices for rechargeable batteries 4 and 5 are raised at also 8 o'clock (c1) and hereby the charge control devices 22 of the rechargeable batteries 4 and 5 shift the charge planned at 8 o'clock to 3 o'clock in order to minimize the electric power expense. The power prices for rechargeable batteries 4 and 5 are raised at also 5 o'clock (d1) and the charge planned at 5 o'clock is shifted to 2 o'clock (d2), and the power prices for rechargeable batteries 4 and 5 are raised at also 6 o'clock (e1) and the charge planned at 6 o'clock is shifted to 1 o'clock (e2). In this way, charging plans are laid at (e2) by each of the charge control devices 22 in conditions approximately agreeing with the optimal output.

As explained above, the charge control devices 22 can be made to recalculate the charging plan after setting the power price, to a maximum value, of a time period where the planned demand is greater than the optimal demand if such time period exists. Since the charging plan is recalculated to minimize the electric power expense for charging by the charge control devices 22, the charging plan is expected to be corrected to reduce the consumed power of time periods having the raised power price. In this way, the concentrated demand is dispersed and the power demand can be brought close to the optimal supply-demand plan.

Further, according to the economical load distribution adjusting device 10 of the present embodiment, as long as the required charge amount (the minimum capacity 2321 at the final time point) of the rechargeable battery 25 is satisfied, a charging plan is created so that the charge amount is kept as small as possible. The life of rechargeable batteries 25, when using lithium ion batteries and the like, are known to have their lives shortened when they are charged up to their maximum capacities. However, as in the economical load distribution system of the present embodiment, life of the rechargeable batteries 25 may be extended by creating a charging plan such that the charged amount is kept small as possible.

Note that in the present embodiment, the economical load distributing system was assumed to have placed a plurality of water level planning devices 21, however, there may be a case where only a single water level planning device 21 is installed. Similarly, there may be a case where only a charge control device 22 is installed. Further, there may be only one or more charge control devices 22 placed without installing a water level planning device 21 or reversely, only one or more water level planning devices 21 installed without installing a charge control device 22.

Additionally, in the present embodiment, the economical load distribution adjusting device 10 was made to recalculate the optimal plan for each of the water level planning devices 21 and the charge control devices 22, however, an optimal plan for only either the water level planning devices 21 or the charge control devices 22 may be recalculated.

Further, in the present embodiment, the charge control devices 22 were assumed to be connected to the rechargeable batteries 25, however, the rechargeable batteries 25 need not be permanently connected to the charge control devices 22 such as is the case with the rechargeable battery 25 mounted on an electric-powered vehicle.

Furthermore, in the present embodiment, each charge control device 22 was assumed to calculate the optimal charging plan, however, a single server may be connected to each group of a plurality of charge control devices 22 and have the pertinent server calculate the optimal charging plan. In this case, the server can be made to include a usage amount acquiring unit 211, an optimal plan request receiving unit 212, an optimal charging plan creating unit 213, a demand transmitting unit 214, and a charge calculation table 231, where the usage amount acquiring unit 211 can acquire the usage amount from each charge control device 22 and the charge calculation table 231 can be provided to each charge control device 22. Even further, limiting conditions associated with hydroelectric power generation assumed only the minimum water intake and maximum water intake, however, other limiting conditions may be set as long as the limiting conditions do not vary from the previous output even when the optimal water level plan is recalculated.

Yet further still, the initial value of the limiting conditions of all the hydroelectric power plants were assumed to be the same, however, the economical load distribution adjusting device 10 can be made to acquire the limiting conditions from the water level planning devices 21.

Even further still, the effective drop hn of all the hydroelectric power plans were assumed to be the same, however, the economical load distribution adjusting device 10 can be made to store the has of each hydroelectric power plants and read them.

Even further still, the charge control device 22 was assumed to be connected to each rechargeable battery 25 in the present embodiment, however, a plurality of rechargeable batteries 25 may be connected to a single charge control device 22.

Figure 27:
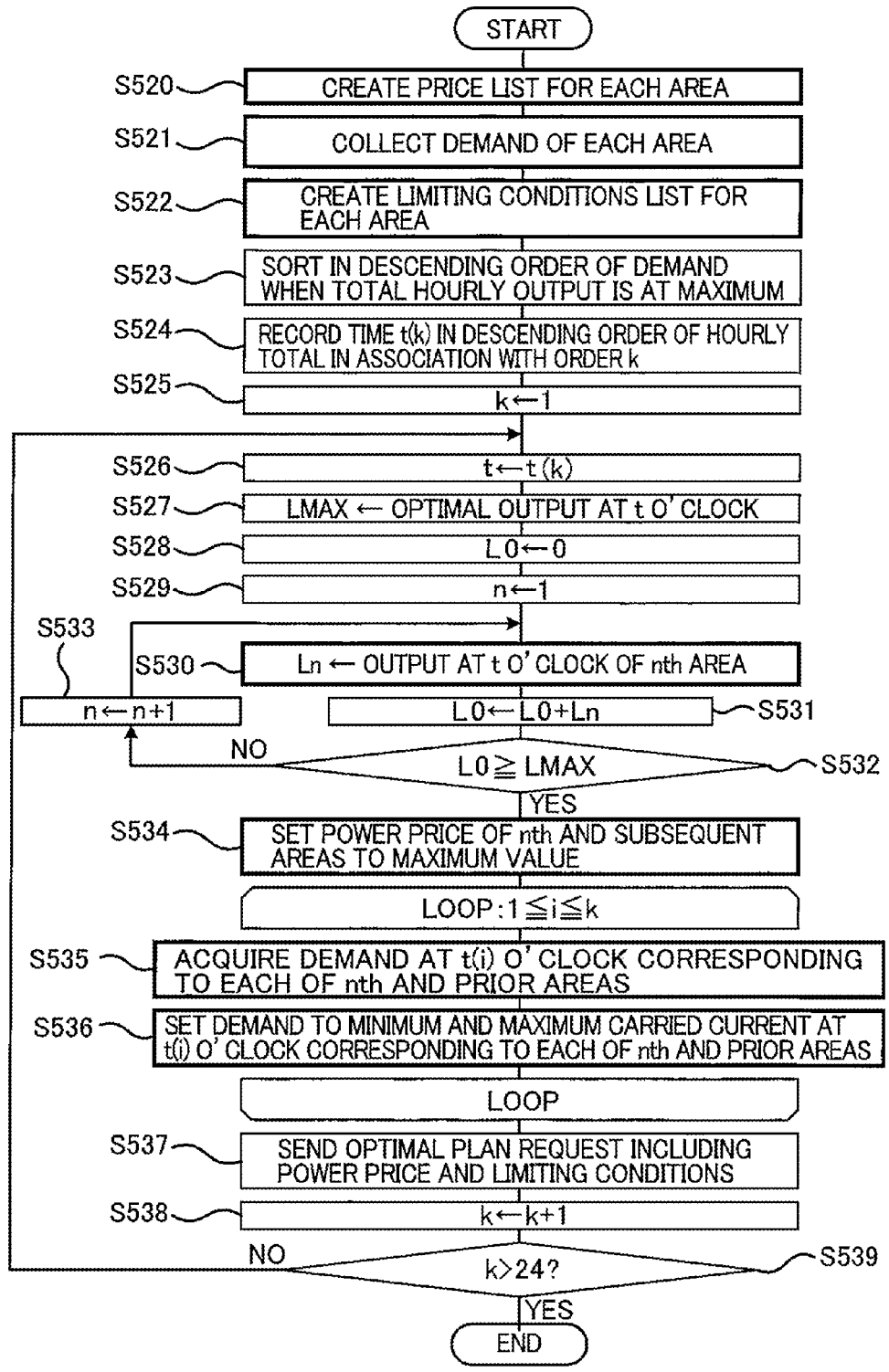
FIG. 27 is a diagram showing the flow of the power price adjustment process shown in FIG. 20 in the case where the price list 71 and the list of power demand 72 are collected for each area.

Even further still, the price list 71 and the demand list 72 were assumed to be created for each rechargeable battery 25 in the present embodiment, however, the rechargeable batteries 25 may be collected into groups when a large number of rechargeable batteries 25 are installed. The group can be, for example, the area where the rechargeable batteries 25 are installed. In this case, for example, the charge control devices 22 sends to the economical load distribution adjusting device 10 area information indicating the area where the rechargeable batteries 25 are installed together with hourly charge demand. The economical load distribution adjusting device 10 sums up the hourly charge demand sent from the charge control devices 22 in the same area and stores in the demand list 72 the hourly charge demand in association with the area information. Further, the economical load distribution adjusting device 10 stores the power price for each area information in the price list 71. The power price adjustment process shown in above FIG. 20 for this case will be as shown in FIG. 27. With regard to FIG. 27, the economical load distribution adjusting device 10 in step S520 creates price list 71 that stores therein the optimal power price received from the supply-demand planning device 23, in association with the areas. The economical load distribution adjusting device 10 in step S521 creates a demand list 72 that has statistically computed for each area the planned demand received from the charge control devices 22. The demand list 72 also has the areas in the column direction and time in the row direction. Note that the economical load distribution adjusting device 10 can store in the demand list 72, for example, the total value, mean value and the median of the planned demand corresponding to each area. The economical load distribution adjusting device 10 in step S530 sets the planned demand at t o'clock of the $n^{th}$ area, in other words sets the value corresponding to t o'clock of the $n^{th}$ column from the left in the demand list 72 to Ln. The economical load distribution adjusting device 10 in step S534 sets the power price of the $n^{th}$ and its subsequent areas, in other words, the value corresponding to t o'clock of the areas after the $n^{th}$ one from the left in the price list 71 to a predetermined maximum value. In step S535, the economical load distribution adjusting device 10 reads t(i) from the time table in order of demand 74 for the $n^{th}$ and preceding areas, and acquires the demand in the demand list 72 corresponding to t(i) o'clock. In step S536, the economical load distribution adjusting device 10 sets the acquired demand to both the minimum carried current and the maximum carried current of the limiting conditions list 73 corresponding to t(i) o'clock for the $n^{th}$ and preceding areas. In step S537, the economical load distribution adjusting device 10, for each of the areas, reads the power price for each time from the price list 71, reads the limiting conditions (minimum capacity and maximum capacity, and minimum carried current and maximum carried current) for each time from the limiting conditions list 73, sends the optimal plan request including the read power price and the limiting conditions to the charge control devices 22 and makes the charge control devices recalculate the optimal charging plan. In this way, calculation load associated with the power price adjustment processes can be relieved when a large number of rechargeable batteries 25 are installed.

Even further still, the economical load distribution adjusting device 10 may divide the rechargeable batteries 25 into groups. In this case, the economical load distribution adjusting device 10 includes a rechargeable battery information storage unit 131 (corresponds to the "group storage unit", "address storage unit", "system storage unit" and "server storage unit" of the present invention) that stores therein information (hereinafter, rechargeable battery information) relating to the rechargeable batteries 25 and a group determining unit that determines the group of the rechargeable batteries 25 based on rechargeable battery information. FIG. 28 is a diagram showing the configuration of the rechargeable battery information storage unit 131. The rechargeable battery information storage unit 131 includes for each rechargeable battery 25, the address where the rechargeable battery 25 is installed, the area number indicating the area in which the pertinent address is included, the system number that specifies the distribution system used to charge the rechargeable battery 25, and the server number that specifies the server connected to the charge control devices 22. Note that the server is a computer that relays communication between the economical load distribution adjusting device 10 and the charge control devices 22.

The group determining unit can divide the rechargeable batteries 25 into groups so that the group of rechargeable batteries 25 has, for example, at least any one of the same address, the same area number, the same system number or the same server number. Further, the group determining unit can also allocate each rechargeable battery 25 to a group randomly.

Figure 29:
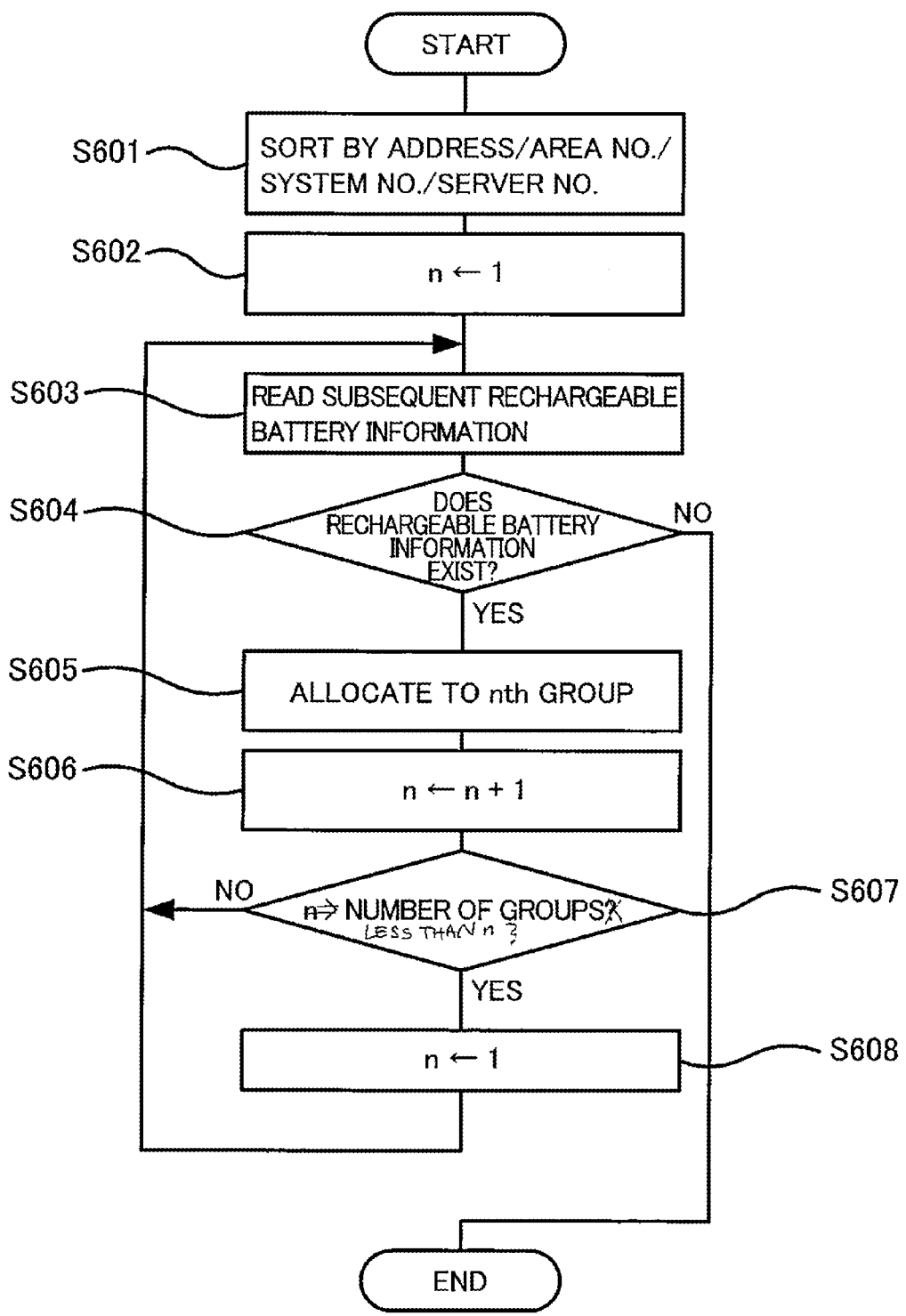
FIG. 29 is a diagram showing the process flow for grouping the rechargeable batteries 25 such that any one among particular addresses, areas, distribution systems and servers are kept from being imbalanced.

Furthermore, the group determining unit can divide the rechargeable batteries 25 into groups so that any one of the address, area, distribution system and the server or a combination thereof are balanced. The grouping process flow by the group determining unit in this case is shown in FIG. 29. First, the group determining unit sorts the rechargeable battery information using any one of the address, the area number, the system number and the server number, or using a combination thereof (S601). Then the group determining unit sets "1" to n (S602) and reads from the rechargeable battery information storage unit 131, the sorted rechargeable battery information in an order starting from the leading rechargeable battery information (S603). When the group determining unit has been able to read the subsequent rechargeable battery information (S605: YES), allocates the rechargeable battery 25 corresponding to the read rechargeable battery to the $n^{th}$ group (S605). The group determining unit increments n (S606), and when n exceeds the predetermined number of the groups, (S607: YES), n is returned to "1" (S608) and repeats the process from step S603. When a subsequent rechargeable battery information does not exist (S604: NO), the group determining unit ends the process. In this way, the group determining unit can divide the rechargeable batteries 25 into a predetermined number of groups so that the address, area, distribution system or the server is dispersed among the groups. In this way, a charging plan is adjusted in units of balanced groups with regard to any one of the address, the area, the distribution system and the server, or a combination thereof. Since charge demand of the rechargeable batteries 25 are dependent on regions in many cases similar to the cases of power usage, the demand is considered to concentrate at each address or area, and therefore grouping is performed by shifting the time period having a concentrated demand when the charging plan is adjusted for all the rechargeable batteries 25 of the address or the area where the demand is concentrated, however, demand concentrating in a certain area can be further certainly dispersed by balanced grouping among addresses or areas. Further, balanced grouping of the distribution system allows the load on the distribution lines to be dispersed, in addition to demand. Further, balanced grouping allows dispersing of the traffic between the economical load distribution adjusting device 10 and the server.

Hereinabove, description was given of embodiments of the present invention, however, the above-described embodiment is intended to facilitate understanding of the present invention and should not be construed as limited to the embodiments set forth here. The present invention may be modified and improved without departing from the scope of the invention, and equivalents thereof are also encompassed by the invention.

REFERENCE SIGNS LIST 10 economical load distribution adjusting device
21 water level planning devices
22 charge control devices
23 supply-demand planning device
24 communication network
101 CPU
102 memory
103 storage device
104 communication interface
105 input device
106 output device
111 optimal supply-demand plan acquiring unit
112 optimal output acquiring unit
113 optimal demand acquiring unit
114 power price adjusting unit
211 usage amount acquiring unit
212 optimal plan request receiving unit
213 optimal charging plan creating unit
214 demand transmitting unit
231 charge calculation table

The invention claimed is:

1. A device for adjusting a plan of demand for power to charge rechargeable batteries, communicatively connected to each of a supply-demand planning device and a demand planning device, the supply-demand planning device calculating an optimal value of demand for power per unit time as well as calculating an optimal value of power price per the unit time, and the demand planning device planning demand for power to charge the rechargeable batteries in accordance with the power price, the device comprising:
 an optimal supply-demand plan acquiring unit configured to acquire from the supply-demand planning device an optimal value of the demand for power and an optimal value of the power price per the unit time;
 an optimal demand acquiring unit configured to control the demand planning device to plan the amount of demand according to the optimal value of the acquired power price and acquire a planned value of the amount of demand from the demand planning device;
 a group determining unit configured to divide the rechargeable batteries into a plurality of groups;
 a demand plan statistical computing unit configured to compute a statistical value, for each of the groups, by statistically computing a plan value of the amount of demand of the rechargeable batteries;
 a price adjusting unit configured to raise the power price for the unit time at which the planned value of the amount of demand of the rechargeable batteries belonging to the group exceeds the optimal value of the amount of demand, in descending order of the statistically computed value, and to control the demand planning device to plan the amount of demand according to the raised power price; and
 a unit configured to charge the rechargeable batteries according to the plan.

2. The power demand plan adjusting device according to claim 1, wherein
 the group determining unit randomly divides the rechargeable batteries into groups.

3. The power demand plan adjusting device according to claim 1, further including an address storage unit configured to store, for each of the rechargeable batteries, an address where a relevant one of the rechargeable batteries is installed,
 wherein the group determining unit refers to the address storage unit and divides the rechargeable batteries into groups in a manner such that the addresses are dispersed into the plurality of groups.

4. The power demand plan adjusting device according to claim 1, further including an area storage unit configured to store, for each of the rechargeable batteries, information that specifies an area where a relevant one of the rechargeable batteries is installed,
 wherein the group determining unit refers to the group storage unit and divides the rechargeable batteries into groups in a manner such that the areas are dispersed into the plurality of groups.

5. The power demand plan adjusting device according to claim 1, further including a system storage unit configured to store, for each of the rechargeable batteries, information that specifies an electric power system used to charge a relevant one of the rechargeable batteries,
 wherein the group determining unit refers to the system storage unit and divides the rechargeable batteries into groups in a manner such that the electric power systems are dispersed into the plurality of groups.

6. The power demand plan adjusting device according to claim 1, wherein
 the power demand plan adjusting device and the demand planning device are connected to a server that relays communication between the power demand plan adjusting device and the demand planning device,
 each of the rechargeable batteries further includes a server storage unit configured to store information that specifies the server connected to the demand planning device that plans the power demand of a relevant one of the rechargeable batteries, and
 the group determining unit refers to the server storage unit and divides the rechargeable batteries into groups in a manner such that the servers are dispersed into the plurality of groups.

7. A method for adjusting a plan of demand for power to charge rechargeable batteries comprising:
 a computer communicatively connected to each of a supply-demand planning device and a demand planning device, the supply-demand planning device calculating an optimal value of demand for power per unit time as well as calculating an optimal value of power price per the unit time, and the demand planning device planning demand for power to charge the rechargeable batteries in accordance with the power price,
 acquiring from the supply-demand planning device an optimal value of the demand for power and an optimal value of the power price per the unit time;
 controlling the demand planning device to plan the amount of demand according to the optimal value of the acquired power price and acquiring a planned value of the amount of demand from the demand planning device;
 dividing the rechargeable batteries into a plurality of groups;
 computing a statistical value, for each of the groups, by statistically computing a plan value of the amount of demand of the rechargeable batteries;
 raising the power price for the unit time at which the planned value of the amount of demand of the rechargeable batteries belonging to the group exceeds the optimal value of the amount of demand, in descending order of the statistically computed value, and controlling the demand planning device to plan the amount of demand according to the raised power price; and charging the rechargeable batteries according to the plan.

8. The power demand plan adjusting method according to claim 7, wherein the computer further stores in a memory information that specifies, for each of the rechargeable batteries, an area where a relevant one of the rechargeable batteries is installed, and the computer refers to the memory and divides the rechargeable batteries into groups in a manner such that the areas are dispersed into the plurality of groups.

9. The power demand plan adjusting method according to claim 7, wherein the computer further stores in a memory information that specifies, for each of the rechargeable batteries, an electric power system used to charge a relevant one of the rechargeable batteries, and the computer refers to the memory and divides the rechargeable batteries into groups in a manner such that the electric power systems are dispersed into the plurality of groups.

10. A program stored in a non-transitory computer-readable medium for adjusting a plan of demand for power to charge a rechargeable battery having a computer, communicatively connected to each of a supply-demand planning device and a demand planning device, the supply-demand planning device calculating an optimal value of demand for power per unit time as well as calculating an optimal value of power price per the unit time, and the demand planning device planning demand for power to charge the rechargeable batteries in accordance with the power price, execute the steps of:

acquiring from the supply-demand planning device an optimal value of the demand for power and an optimal value of the power price per the unit time;

controlling the demand planning device to plan the amount of demand according to the optimal value of the acquired power price and acquiring a planned value of the amount of demand from the demand planning device;

dividing the rechargeable batteries into a plurality of groups;

computing a statistical value, for each of the group, by statistically computing a plan value of the amount of demand of the rechargeable batteries; and raising the power price for the unit time at which the planned value of the amount of demand of the rechargeable batteries belonging to the group exceeds the optimal value of the amount of demand, in descending order of the statistically computed value, and controlling the demand planning device to plan the amount of demand according to the raised power price.

11. The program according to claim 10, wherein the computer is made to further execute a step of storing in a memory information that specifies, for each of the rechargeable batteries, an area where a relevant one of the rechargeable batteries is installed, and the computer is made to refer to the memory and divide the rechargeable batteries into groups in a manner such that the areas are dispersed into the plurality of groups.

12. The program according to claim 10, wherein the computer is made to further execute a step of storing in a memory information that specifies, for each of the rechargeable batteries, an electric power system used to charge a relevant one of the rechargeable batteries, and the computer is made to refer to the memory and divide the rechargeable batteries into groups in a manner such that the electric power systems are dispersed into the plurality of groups.

* * * * *